US008040233B2

(12) United States Patent
Adappa et al.

(10) Patent No.: US 8,040,233 B2
(45) Date of Patent: Oct. 18, 2011

(54) METHODS AND SYSTEMS FOR CONFIGURING MOBILE DEVICES USING SENSORS

(75) Inventors: Abhishek Adappa, San Diego, CA (US); Aditya Narain Srivastava, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 12/140,020

(22) Filed: Jun. 16, 2008

(65) Prior Publication Data

US 2009/0309711 A1 Dec. 17, 2009

(51) Int. Cl.
*G08B 19/00* (2006.01)
(52) U.S. Cl. .......................... 340/522; 340/517; 340/521
(58) Field of Classification Search .................. 340/506, 340/517, 539.11, 539.13, 539.17, 539.22, 340/539.26, 505, 521–525; 705/10; 110/8; 455/456.1; 700/94; 445/456.1
See application file for complete search history.

(56) References Cited

U.S. PATENT DOCUMENTS

| 7,376,414 | B2 | 5/2008 | Engstrom | |
|---|---|---|---|---|
| 7,542,816 | B2 * | 6/2009 | Rosenberg | 700/94 |
| 2002/0107027 | A1 | 8/2002 | O'neil | |
| 2003/0088496 | A1 | 5/2003 | Piotrowski | |
| 2008/0045207 | A1 | 2/2008 | Ahn et al. | |
| 2008/0140868 | A1 * | 6/2008 | Kalayjian et al. | 710/8 |
| 2009/0006194 | A1 * | 1/2009 | Sridharan et al. | 705/14 |
| 2009/0112693 | A1 * | 4/2009 | Jung et al. | 705/10 |
| 2009/0150217 | A1 * | 6/2009 | Luff | 705/10 |
| 2009/0197616 | A1 * | 8/2009 | Lewis et al. | 455/456.1 |
| 2009/0300525 | A1 * | 12/2009 | Jolliff et al. | 715/764 |

FOREIGN PATENT DOCUMENTS

| EP | 1780991 A1 | 5/2007 |
|---|---|---|
| EP | 1885109 A2 | 2/2008 |
| WO | WO2005039160 | 4/2005 |

OTHER PUBLICATIONS

International Search Report and the Written Opinion—PCT/US2009/046677, International Search Authority—European Patent Office—Nov. 20, 2009.

* cited by examiner

*Primary Examiner* — Van T. Trieu
(74) *Attorney, Agent, or Firm* — James T. Hagler

(57) ABSTRACT

Methods and systems enable selection of a theme for implementation on a computing device based on sensor data. The computing device can include a variety of sensors including sensors capable of sensing ambient temperature, light, and sound, as well as geographic position, for example. Data collected by a sensor is used to select a theme correlated to the sensed condition. Data from sensors can also be used to generate customized advertisements that can be displayed on the computing device.

62 Claims, 19 Drawing Sheets

| Themes Description | Theme IDs | Sensor Type | Sensor criteria | Theme elements | Theme location |
|---|---|---|---|---|---|
| Blue Glow | 000001 | Temperature | < 50 F° | Display and keypad backlight | Local memory address XXXX |
| Yellow Glow | 000002 | Temperature | > 51 F° & < 70 F° | Display and keypad backlight | Local memory address YYYY |
| Red Glow | 000003 | Temperature | > 71 F° | Display and keypad backlight | Local memory address ZZZZ |
| Green Glow | 000004 | GPS | Forest Location | Display and keypad backlight | External memory URL XXX |
| Snow | 000005 | Temperature/ Light | < 45 F° & low sun light | Display and keypad images and menus | External memory URL YYY |
| Sunshine | 000006 | Temperature/ Light | > 71 F° & bright sun light | Display and keypad images and menus | External memory URL ZZZ |

FIG. 5

METHODS AND SYSTEMS FOR CONFIGURING MOBILE DEVICES USING SENSORS

FIELD OF THE INVENTION

The present invention relates generally to mobile computing systems, and more particularly to configuring the layout and functionality of mobile devices using sensors.

BACKGROUND

The usage of mobile electronic devices (mobile devices), such as cellular telephones, is ever increasing due to their portability, connectivity and ever increasing computing power. As mobile devices become an everyday accessory, users seek to customize the layout and functionality of their mobile devices to complement their personalities and environment. However, traditional mobile devices do not provide a complete user experience. Recently, mobile devices have been released featuring different user interfaces. Further innovations are expected to provide more complete user experience, better user-interfaces and support more useful applications.

SUMMARY

The various embodiments provide methods and systems for configuring a theme implemented on computing devices using data collected by sensors. Themes may be stored locally on the computing device or externally on servers with which the computing device can communicate. The computing device can then select an appropriate theme based on the data collected by a sensor and apply it to the computing device.

The various embodiments provide methods and systems for presenting advertisements on a computing device based on data collected by sensors. The collected sensor data and a request for advertisement may be communicated to an external server which may include an advertisement database. Based on the sensor and other data received, advertisement can be targeted to and customized for a particular user and sent to the user's computing device.

The various embodiments further provide methods and systems for conserving energy using data generated by sensors. For example, the backlight of a computing device may be adjusted based on the data collected by an ambient light sensor. If the ambient light is low, the computing device can conserve energy by reducing the intensity of its backlight. If the ambient light is intense, the computing device can increase the intensity of its backlight to ensure visibility of the display contents.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 5 is an example parameter data table suitable for storing a variety of theme data relating to data collected by sensors.

DETAILED DESCRIPTION

Figure 1:
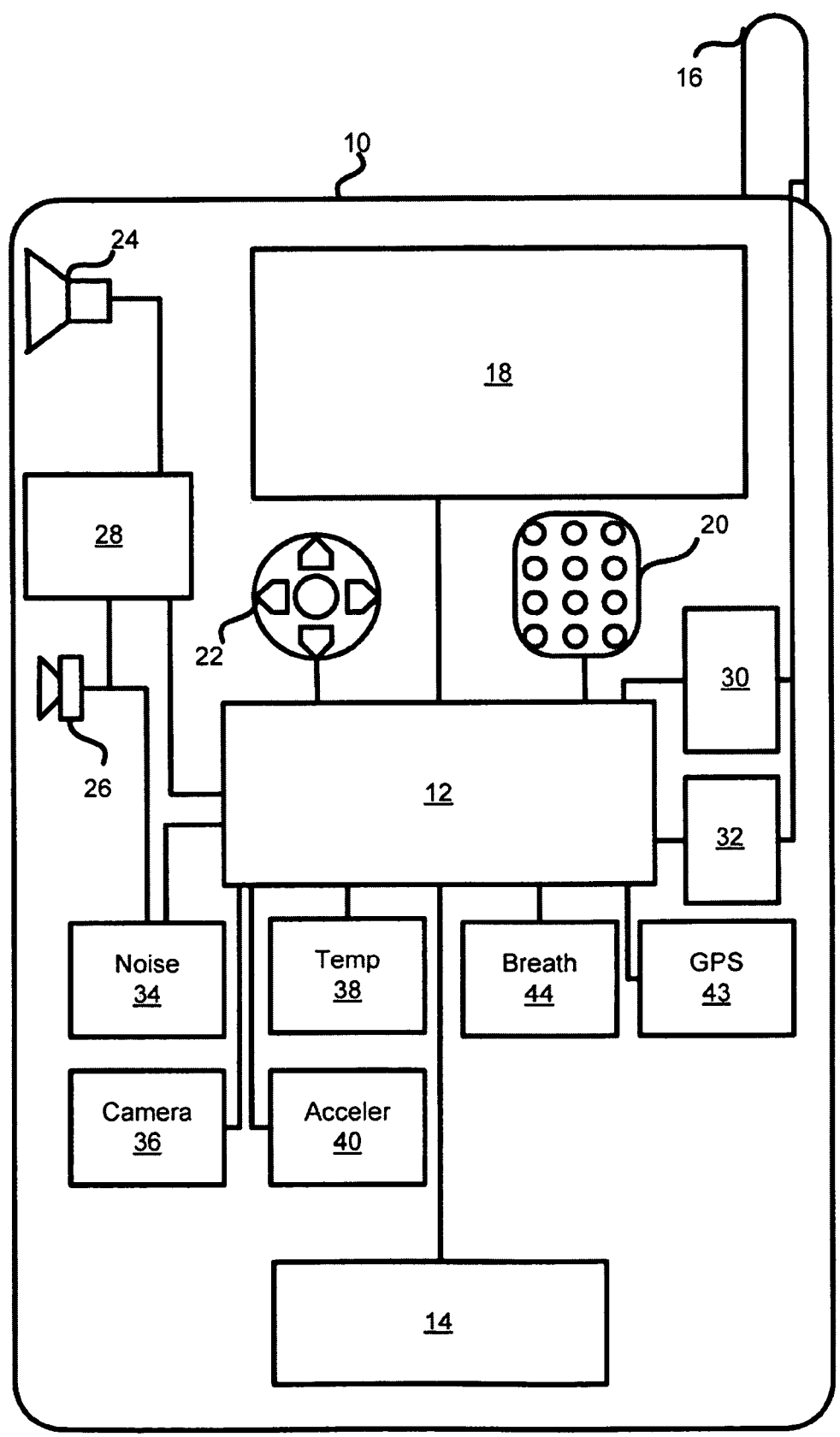
FIG. 1 is a component block diagram of a typical cell phone usable with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used herein to mean "serving as an example, instance, or illustration." Any implementation described herein as "exemplary" is not necessarily to be construed as preferred or advantageous over other implementations.

As used herein, the term "computing device" refers to any programmable computing device including a display and a keyboard or keypad. In descriptions of various embodiments, reference is made to "mobile devices" which are but one type of computing device that implement the various embodiments. As used herein, the terms "mobile handsets" and "mobile devices" are used interchangeably and refer to any one of various cellular telephones, personal data assistants (PDA's), palm-top computers, laptop computers (including those with wireless modems), wireless electronic mail receivers (e.g., the Blackberry® and Treo® devices), cellular telephones, and multimedia Internet enabled cellular telephones (e.g., the iPhone®), and similar computing devices.

As used herein, the term "keypad" refers to any of a variety of user interfaces in which a user presses a button or key in order to communicate to a mobile device that a function associated with the key should be implemented. Examples of keypads encompassed within the following description include the number keypads of conventional cellular telephones, miniature keyboards as is implemented on a variety of mobile devices, external keypads and keyboards which may be electronically coupled to a mobile device (e.g., via a wired or wireless data link), computer keyboards, and musical keyboards which may be coupled to a personal computer, mobile device or other computing device. For ease of description, the figures depict and the descriptions refer to the keypad of a typical cellular telephone. However, these descriptions and illustrations are for example only, and are not intended to limit the scope of the description or the claims to a particular keypad configuration.

Modern cellular telephones and other mobile devices make use of a variety of different keypads for receiving user inputs. Some modern mobile devices include two or more keypads integrated within the device. For example, some cellular telephone designs include a number keypad for use in placing telephone calls, and a miniature keyboard which can be activated by sliding, opening or rotating a portion of the telephone to expose the keyboard. As another example, some cellular telephones may include a fixed keypad and a touchscreen user-interface which may be operated as a passive display or a touch sensitive interface depending upon user selections and application software.

The various embodiments enable a mobile device to employ sensors for collecting information from users' environment and change the graphics, layout and functionality of the mobile device based on data collected by the sensor. Example sensors that may be included within a mobile device include temperature, location (e.g., a Global Positioning System (GPS) receiver), vibration (e.g., provided by an accelerometer), light and sound sensors. The various embodiments are useful in, for example, detecting the temperature and changing the theme of the mobile device based on the temperature recordings. By changing the theme and the user-interface, mobile devices can provide the users with an interesting, versatile and complete user experience. The various embodiments may also be useful in detecting data using a sensor and transmitting the data to a third party for advertisement purposes. The user can then receive targeted and customized advertisements based on the information collected by the sensors and transmitted to the third parties. The various embodiments also enable a mobile device to use the information collected by sensors to conserve energy. For example, a mobile device can use light sensors to adjust the intensity of the mobile device's backlight to extend the charge or the life of a battery. As a further example, a mobile device can use an ambient noise sensor (e.g., a microphone) to adjust the volume setting of ring tones or the selection of audio themes in order to ensure rings or other audio alerts can be heard or are not inappropriately too loud for the ambient noise condition.

FIG. 1 illustrates a system block diagram of a mobile device 10 for use in the various embodiments. As shown in FIG. 1, a mobile device 10 may include a microprocessor 12, a memory 14, an antenna 16, a display 18, an alphanumeric keypad 20, a 4-way menu selector 22, a speaker 24, a microphone 26, a vocoder 28, a wireless network transceiver 30, and various interconnections. In addition, mobile device 10 may contain an ambient noise sensor 34 which may include the a microphone or may be connected to the microphone 26 to detect ambient noise levels when a telephone or sound recording application is not activated. Mobile device 10 may also include a camera 36 which in addition to taking pictures has a CCD camera circuit which can be configured to be capable of detecting ambient light levels when a camera application is not activate. The mobile device may also contain an ambient temperature sensor 38 and an accelerometer 40 which may detect the relative acceleration of the mobile device 10. The mobile device 10 may also have a GPS receiver unit 43 which is capable of detecting the precise global position of the mobile device 10. Other sensors may include a breathalyzer 44 which is capable of detecting a blood alcohol content (BAC) based on the expelled breath of a user. Additional biometric sensors such as a blood pressure monitor, pulse rate, body temperature, etc. can easily be incorporated.

The mobile device 10 may further include a short range wireless transceiver 31, such as a BlueTooth® or WiFi transceiver, may be incorporated to communicate with external devices which may include a number of external sensors. Each of the mobile device sensors 34-46 may be connected to the processor 12, which is in turn connected to an internal memory unit 14. In this manner, the processor 12 may collect parameter data from the various sensors 34-46 and store the data in the memory unit 14 or transmit the data via an external network via the wireless network transceiver 32. It should be noted that while mobile device 10 is depicted in FIG. 1 as a mobile handset or cell phone, the system blocks may be implemented in any computing device with wireless communication capability. Thus, FIG. 1 is not intended to be limited to or exclude any particular type of computing device.

Figure 2:
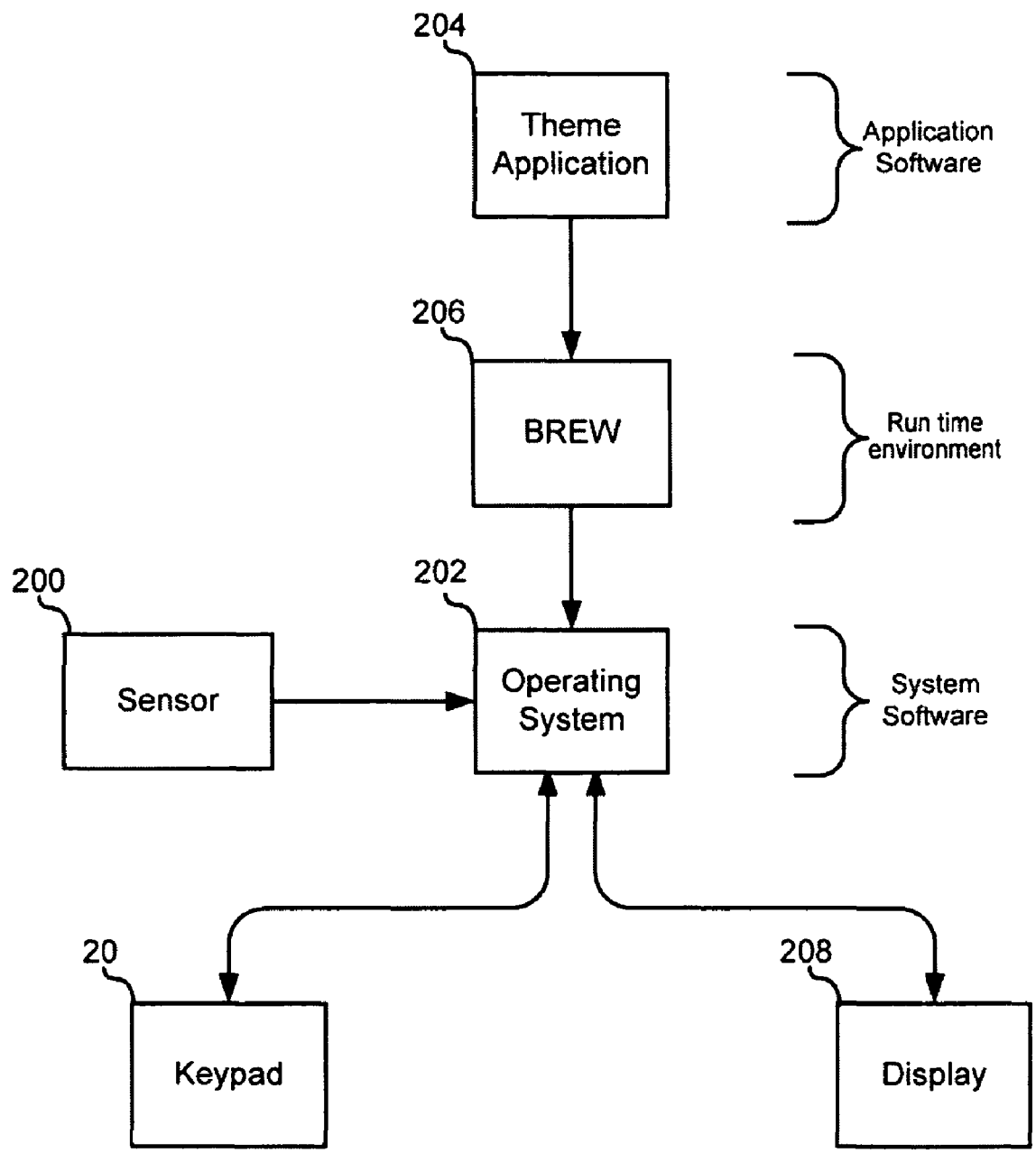
FIG. 2 is a hardware/software architecture diagram of an embodiment.

FIG. 2 illustrates a software/hardware architecture diagram that may be implemented in the various embodiments for changing the theme of a mobile device 10 using data collected by a sensor. In this example architecture, a sensor 200 makes measurements of the environment of the mobile device and converts the measurements into digital information which the processor 12 can understand. This data is communicated to the system software 202 such as an Operating System operating on the mobile device processor 12. When the various embodiments are implemented within the system software layer 202 the system software can select a theme based on the data received from the sensor 200 and apply the theme to the mobile device display 18 and the keypad 20. In addition to changing the theme on the display and the keypad, the mobile device 10 can change the theme throughout its menu options to provide the user with a complete and uniform user experience. A mobile device 10 may have a number of theme files stored in its memory 14 from which an appropriate theme may be selected, or may access and download additional themes from external theme databases stored on, for example, a server accessible via a network. Additional themes may be loaded onto the mobile device 10 by a theme application, such as theme download application 204. The theme download application 204 may interface with a runtime environment 206, such as the Binary Runtime Environment for Wireless BREW® in order to facilitate communications with system software 202. When a new theme is stored in the mobile device memory 14, it may be implemented immediately or become a part of the stored theme files available for future use. When required, the system software 202 may access the stored theme files for implementing one on the display 18 and keypad 20 of the mobile device 10. If the mobile device 10 downloads a new theme and immediately applies the theme to the display 18 and keypad 20, the theme may not be saved in memory, so that the theme will be deleted the next time the theme is replaced, such as based on new sensor 200 data. Deleting unused themes saves memory 14 space which can be used for other purposes.

To implement a theme which changes displays and functionality presented on the keypad 20, the mobile device 10 may employ a keypad protocol layer within the system software 202 to facilitate the embodiment methods and applications. Such a keypad protocol is described in U.S. patent application Ser. No. 12/139,823 entitled "Standardized Method and Systems for Interfacing with Configurable Keypads", filed on Jun. 16, 2008, the entire contents of which are hereby incorporated by reference. The keypad protocol layer serves as an interface between application software and keypad drivers that enable application software to define keypad configuration requirements to the operating system and receive configuration instructions in standard formats. By doing so, the process of configuring a keypad 20 by, for example, changing the theme displayed on the keys 402 of the keypad 20 can be performed by the keypad protocol, removing the need to include this processing within application software. The description with reference to FIGS. 2 through 18 describes embodiments implemented on mobile devices 10 which may include such a keypad protocol layer within their system software.

Figure 3:
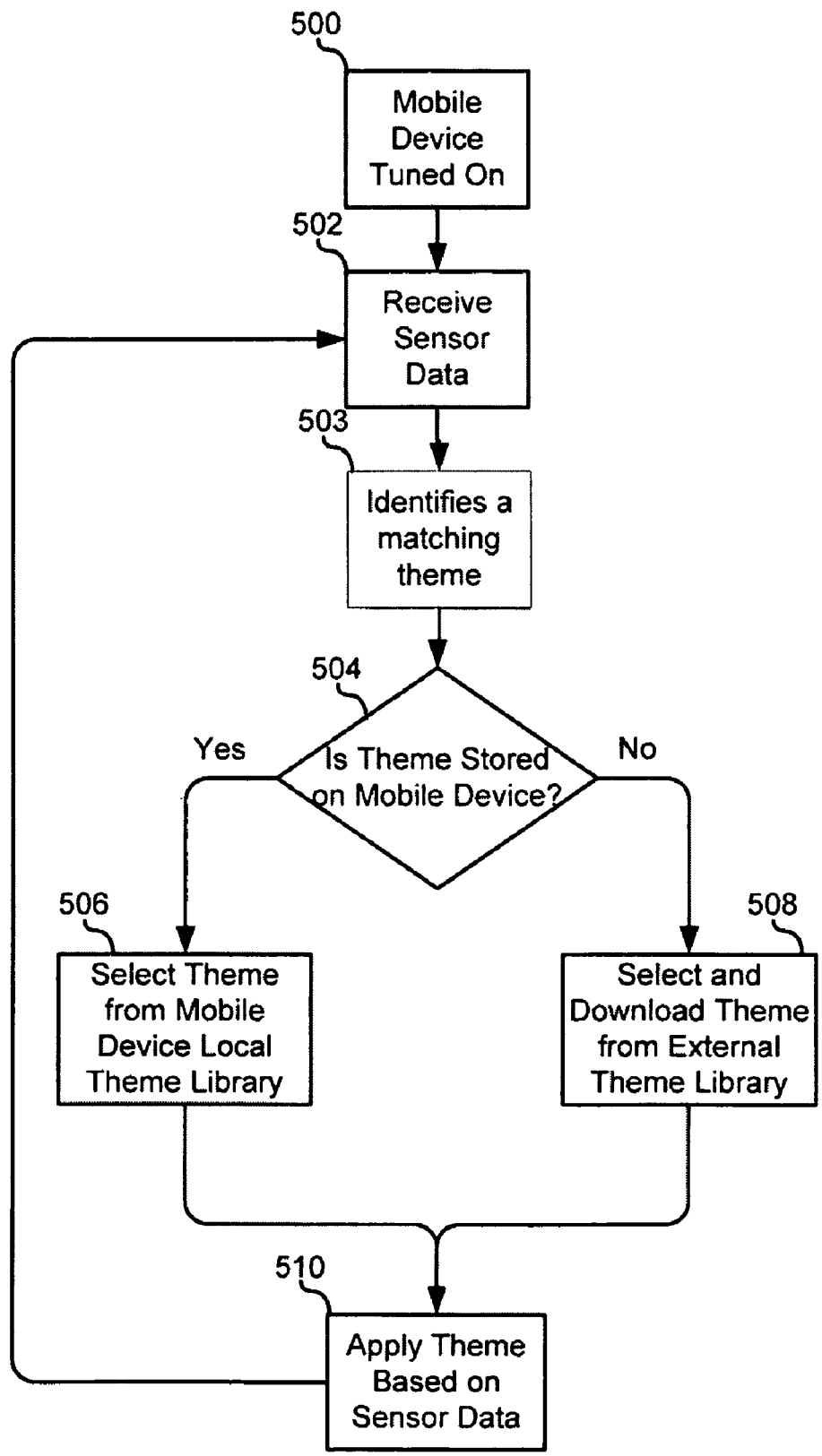
FIG. 3 is a process flow diagram of an embodiment.

FIG. 3 is a process flow diagram of an embodiment illustrating example steps that may be used to change the theme implemented on a mobile device 10 based on sensor data. Once the mobile device 10 is turned on, step 500, the processor 12 may begin receiving data collected by one or more sensors 200, step 502. As mentioned above, a sensor 200 makes measurements of the environment and converts the measurements into digital data which the processor 12 can understand. In an exemplary embodiment the sensor 200 may be a temperature sensor 38, such as a thermistor or thermocouple in conjunction with circuitry to convert measured resistance or voltage into digital data related to temperature as are well known in the art. Such a temperature sensor 200 may be configured within the mobile device 20 so that it is capable of measuring the ambient temperature and providing the resulting data to the mobile device processor 12. Data from the sensor 200 is received by the processor 12 which may be configured by software, such as system software 202, to use the sensor data to select a theme for implementation. The processor 12 may have access to a list or index of theme files stored in memory from which a theme may be selected based on data received from the sensor 200, step 503. The theme list is described in more detail below with reference to FIG. 5. The processor 12 may then scan the theme list to select an appropriate theme based on the information received from the sensor 200, test 504. If the selected theme is stored in the mobile device's local memory 14 (i.e., test 504="Yes"), the selected theme file is accessed and the theme elements (e.g., display images, ring tones, and keypad displays if appropriate) ARE applied to change the theme of the mobile device 10, step 510. If the selected theme is not stored locally in the mobile device's memory 12 (i.e., test 504="No"), the selected theme may be downloaded from an external theme database such as by using a theme download application 206, step 508, before being applied to the mobile device 10, step 510. The process steps of receiving sensor data, selecting a theme and applying the theme to the mobile device 10, steps 502-510, may be repeated periodically to ensure that the theme remains appropriate for new data collected by the sensor 200, returning to step 502.

Figure 4:
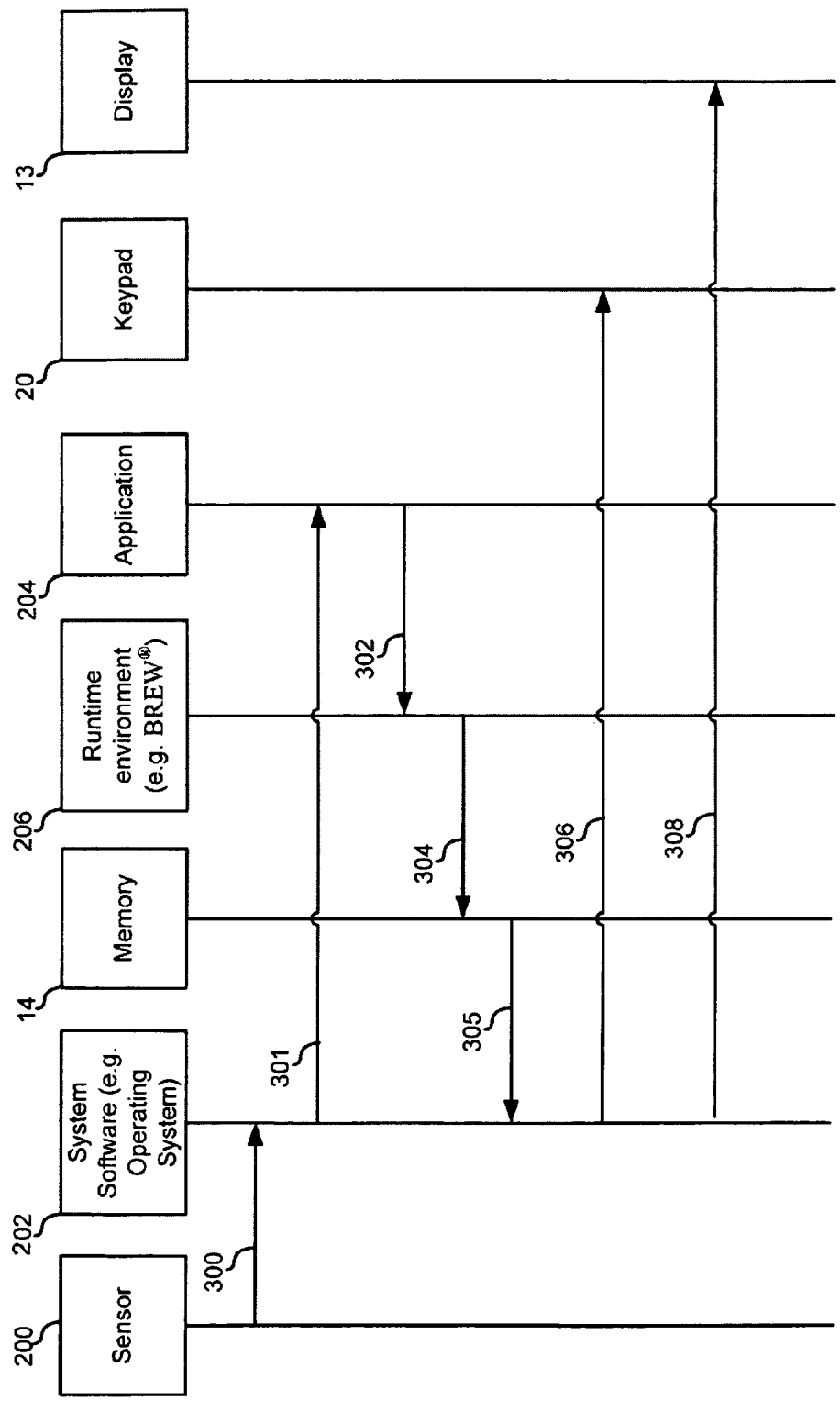
FIG. 4 is a message flow diagram associated with the process steps illustrated in FIG. 3.

The example process steps illustrated in FIG. 3 may be implemented in a number of electronic messages passed among the different hardware and software layers in the mobile device 10, such as illustrated in FIG. 4. Periodically or upon poling sensors the system software 202 receives data from the sensor 200, message 300. As described above, the system software 202 may cause the processor 12 to use the sensor data to select a theme that is related to or appropriate in view of the collected sensor 200 data. If the selected theme is stored in memory 14, the system software 202 may access the selected theme files, message 305. Using the theme files, the system software 202 can formulate instructions to apply theme elements to the mobile device's keypad 20, message 306, and display 18, message 308. The theme may also be applied to the mobile device's 10 user menus to provide a more complete user experience. If the selected theme is not available in the mobile device memory 14, additional themes may be downloaded and stored in the mobile device memory 14 using a theme download application 204. To do this, the selected theme identification information may be provided by system software 202 to the theme download application 204, message 301. The theme download application 204 may then access a remote server via a wireless data network (e.g., a cellular telephone data network) to request and receive the theme files using well known wireless network and Internet protocols and application software. In doing so the theme download application 204 will interface with the runtime environment 206 and system software 202, as well other mobile device 10 resources; however, the messages involved in such processing are well known and are therefore are not included in FIG. 4. Once theme files have been downloaded or during downloading, the theme download application 204 may interfaces with the runtime environment 206, messages 302, to store theme files in memory 14, messages 304. The processor 12 may then receive the new theme file from mobile device memory 14, message 305, and apply the new theme elements to the mobile device's keypad 20, message 306, and display 18, message 308.

The processor 12 may make use of a comprehensive theme list stored in memory 14 to select a theme most appropriate to current data collected by the sensor 200. The processor 12 uses the data collected by the sensor 200 to first select a theme from the theme list before scanning local memory for the theme files t and applying the theme elements to the mobile device 10. If the selected theme is not available in the local theme database, the processor 12 may retrieve it by sending a request to an external theme database stored on, for example, an external server. Such a theme list may be manually or automatically updated as new themes are made available for the mobile device 10. For example, as new themes are stored in memory, the theme descriptors described below may be added to the theme list. Further, if a user has subscribed to an external server maintaining a theme database, the external server may periodically send messages to the mobile device 10 to update the theme list stored in memory to reflect all themes maintained in the server's theme database.

FIG. 5 illustrates an example data structure of a theme list 550 that may be stored in memory 14 and accessed by the processor 12. FIG. 5 illustrates a common table form of data structure comprised of a number of data records 554-564 each of which includes a number data fields, which may be illustrated as columns 566-576. However, other data structures may be used for storing the information illustrated in FIG. 5. Each data record in the theme list 550 may include data fields storing theme descriptor information useful in implementing the various embodiments, such as a theme description 566, theme ID 568, sensor 200 type 570, sensor criteria 572, associated theme elements 574 and the storage location of theme files 576. The processor 12 can use this theme list 550 to identify which theme to use by scanning the list for records containing the same sensor type in data field 570 and the sensor 200 from which data was received, and then comparing the sensor criteria values in data filed 572 to the received sensor data. If the processor determines that the sensor type(s) matches the sensor(s) 200 and the sensor data satisfies the sensor criteria, the processor can use the theme storage location data in data field 576 to access the associate theme files and apply the theme elements identified in data field 574.

To illustrate how the theme list 500 can be used to implement a theme consider the example illustrated in data record (i.e., row) 554. This example theme record includes data for a theme referred to as "Blue Glow" (identified in data field 566) which is based upon data received from the temperature sensor (identified in data field 570). This theme may be implemented on the mobile device when data from a temperature sensor 38 indicates that the ambient temperature is below 50 F.° based upon the theme sensor criteria in data field 572. This theme is stored in local memory 14 of the mobile device 10 and can be accessed at memory location XXXX without having to download it from an external server. The processor 12 may alternatively use the theme ID, in this case "000001" as indicated in data field 568 to locate the theme within the mobile device memory 14. The processor is also informed that the theme will be applied to the display and keypad backlight as indicated in data field 574. By applying this theme to the display 18 and keypad 20, the color of the backlight may change to blue as the user may feel is appropriate to reflect the cold surrounding environment.

Similarly, data records 556 and 558 of the theme list 550 identify other themes that are available in the memory 14 of the mobile device 10 that should be applied to the display 18 and keypad 20 based upon different temperature sensor criteria. As this example illustrates, users can use the various embodiments to automatically implement a number of themes on their mobile device depending upon ambient conditions measured by a sensor, such as a temperature sensor.

As a further illustration of the use of the theme list 550, data record 560 includes a theme referred to as "Green Glow" which is based upon geographic position data received from a GPS receiver 43 (identified in data field 570). When data received from the GPS receiver 43 indicates that the mobile device is located geographic coordinates known to be a forest or a location with dense vegetation, the processor may select this theme to apply to a green backlight color to the display 18 and keypad 20. Because this theme is not available on the local theme database (see data field 576), the processor can access a wireless data network to access a remote server and request this theme such as by using the address (e.g., a URL) information stored in data field 576.

In an embodiment, data collected by multiple sensors 200 may be used in combination to select a theme for the mobile device 10. For example, data records 562 and 564 include themes that may be selected based upon data collected by a temperature sensor 38 and an ambient light sensor 36. Considering data record 562, for example, when the measured temperature is lower than 45 F.° and the ambient light is dim, the processor 12 may select the "Snow" theme to change the image and colors presented on the display 18 and keypad 20 to a snow related image and color scheme. In contrast, if the ambient temperature is above 71 F.° and ambient light is bright, the processor 12 may select the "Sunshine" theme identified in data record 564 to change the image and colors presented on the display 18 and keypad 20 to a sun related image and color scheme.

The theme list 550 may be automatically or manually populated and updated to add, delete or upgrade the themes available to the mobile device 10. For example, using a menu application, users may be prompted to identify sensor criteria for activating themes stored in memory, with the menu application using user responses to create, populate and/or update the theme list 550 as appropriate. As another example, users may subscribe to a service which maintains a variety of themes available for download. As part of this service theme lists 550 may be periodically communicated to subscriber mobile devices for storage in memory. Users may also have access to different theme lists based on their plan contracts with the carrier companies. For example, basic themes may be available with economical plans and more complex and more variety of themes may be available with more luxury plans. Thus, users may be able to manually select from a list of alternative theme lists maintained by a service provider, with the selected theme list then automatically downloaded to their mobile device.

Users may manually activate or deactivate the theme list 550. When deactivated, the mobile device 10 will not change themes automatically. This may be desired when the users prefer to maintain a particular theme on their mobile devices 10. Users may also delete themes from the theme list 550. This may be useful when users do not enjoy a particular theme and prefer not to have it applied to their mobile device 10. Allowing users to freely customize their preferences for automatic theme implementation gives users more options for customizing and personalizing their mobile devices.

Figure 6:
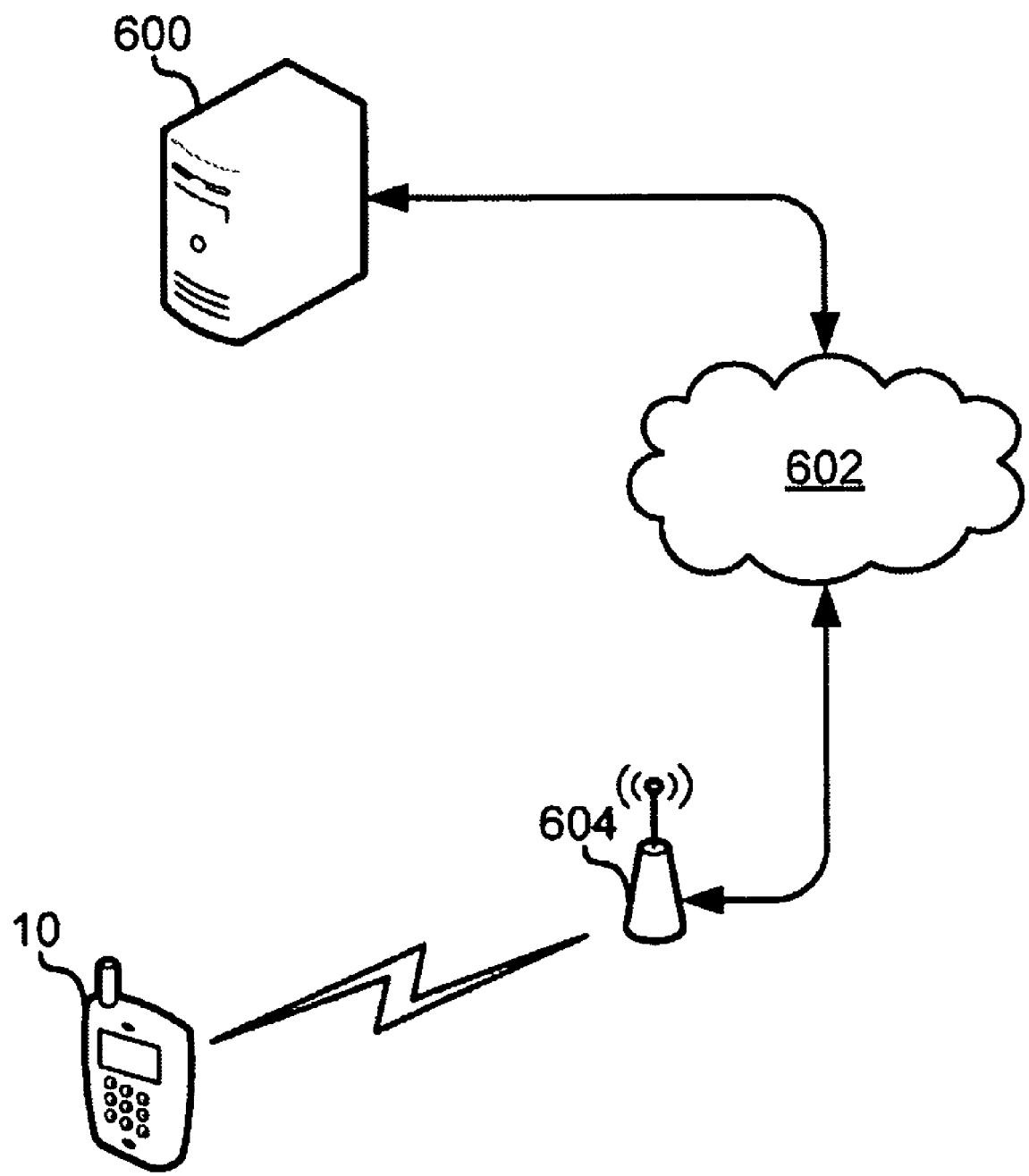
FIG. 6 is a network diagram of an embodiment.

In an embodiment, FIG. 6 illustrates a diagram of a wireless network that may be used to download a theme from an external server 600. The server 600 may include a theme database from which the mobile device 10 may download a selected theme. The server 600 may be maintained and updated by the mobile device 10 carrier or a third party contractor. When a selected theme is not available on the local theme database of a mobile device 10, the mobile device 10 may use the wireless network to send a request message to the server 600 to download the selected theme. To request a theme file download, the mobile device processor 12 may load a theme download application 204 to configure the processor to process messages to and from the server 600. The request message is received by a wireless access point 604 and then sent via a network 602, such as the Internet, to the server 600. The reception and transmission of such request messages would employ well known wireless data network and Internet protocols and technologies. The server 600 processes the request message and sends the requested theme files to the mobile device 10 through the network 602 and the wireless access point 604 using known network protocols and technologies. The theme download application 204 may receive theme file download messages from server 600 and extract the theme files from the messages, store the files in memory 14 and inform system software 200 that the selected theme is available for implementation. The processor 12, configured by system software, then applies the new downloaded theme elements to the mobile device's keypad 20 and/or display 18 and changes ring tones and theme audio files as appropriate.

Figure 7:
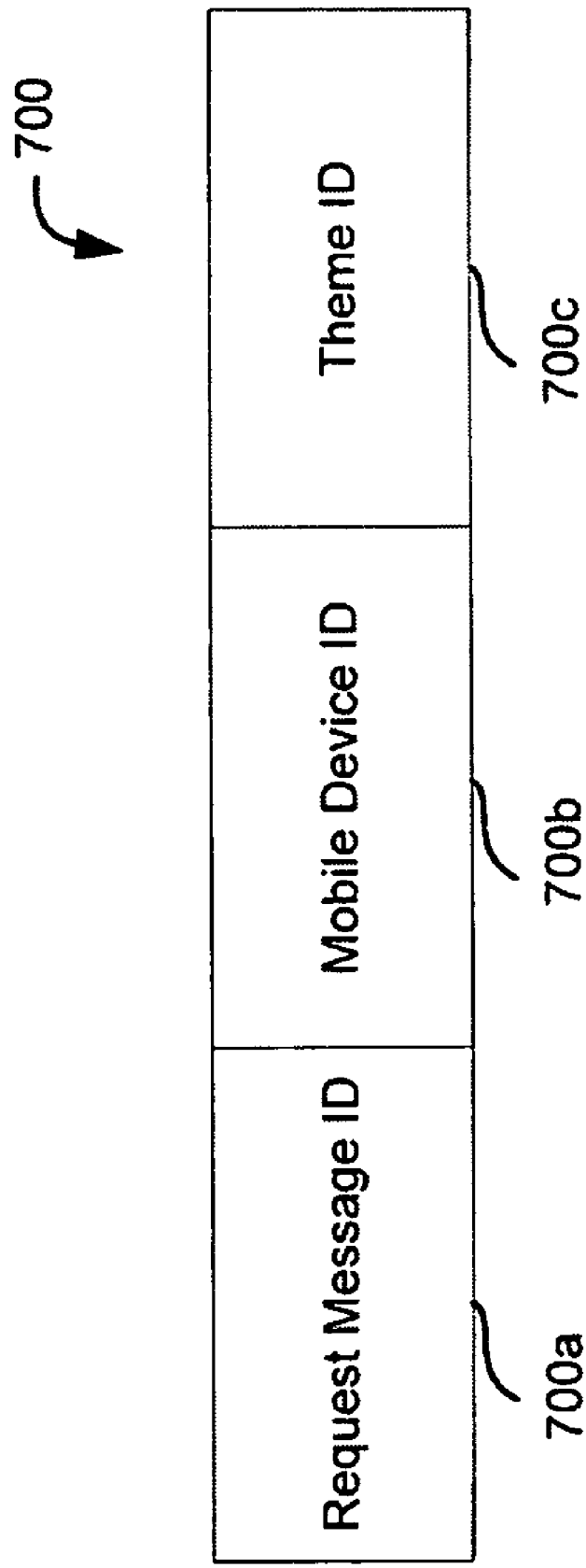
FIG. 7 is a message structure diagram for an exemplary embodiment.

In an embodiment illustrated in FIG. 7, the request message 700 may include a theme request message code or ID 700a which identifies the message as one for requesting a theme download. The request message 700 may also include a mobile device code or ID 700b which can identify the type of mobile device 10 so the server 600 is able to look up technical specifications of the requesting mobile device 10. This would allow the server 600 to transmit a theme download files in a format that is compatible with the requesting mobile device 10. The request message 700 may also include a theme ID 700c which identifies the requested theme with an code or value that can be used to quickly locate the theme files in a theme database. Using this request message 700 the server 600 can access the requested theme within a theme database and configure theme file download messages for transmission to the mobile device 10.

Figure 8:
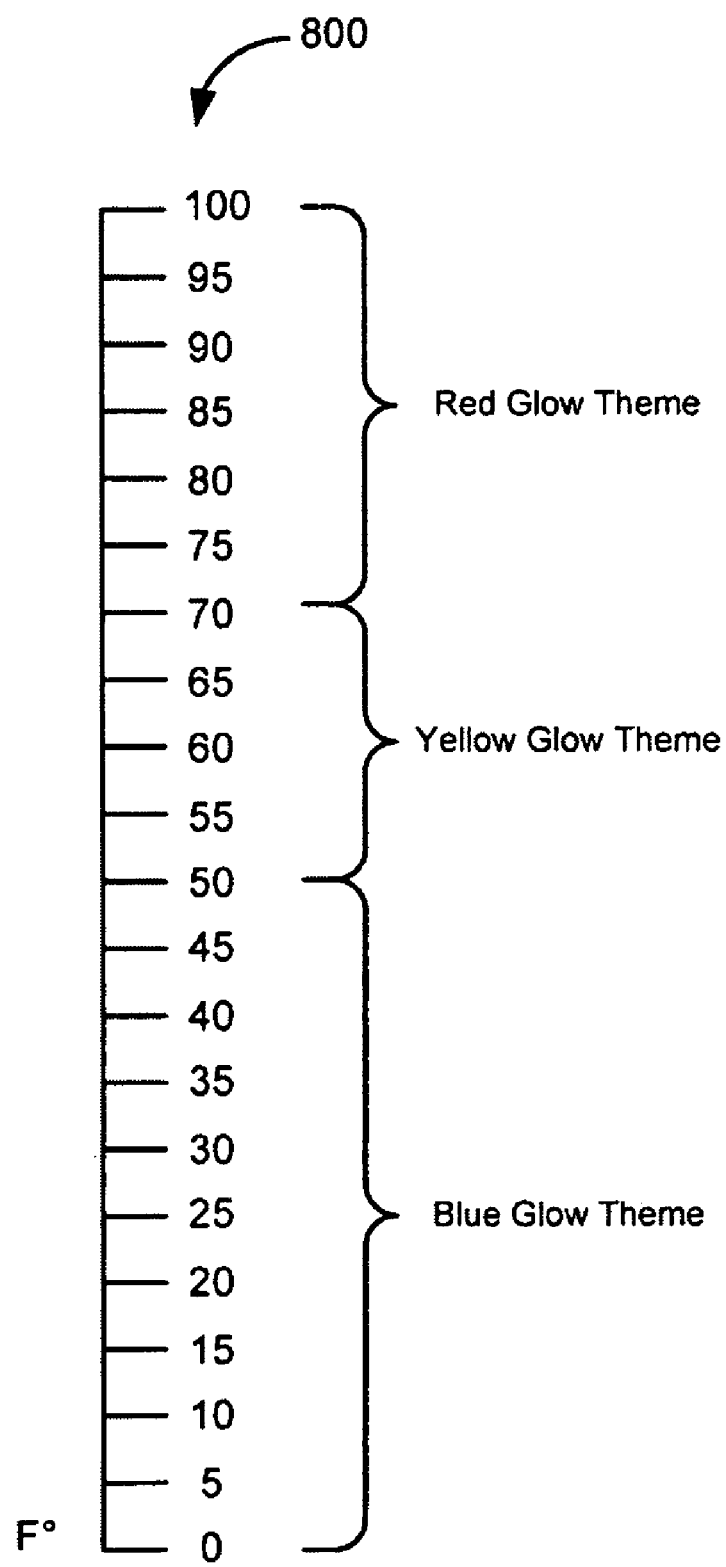
FIG. 8 is an illustration of an embodiment presenting theme changes on a computing device based on temperature.

In an exemplary embodiment, a mobile device 10 may use a temperature sensor 38 to select an appropriate theme. As illustrated in FIG. 8, a mobile device processor 14 may be configured with software to change various aspects of its keypad 20 and display 18, such as adjusting the backlight color, based on the measured ambient temperature. This embodiment is illustrated in FIG. 8 in the form of a temperature scale 800 from 0 to 100 degrees Fahrenheit (F.°) and examples of themes implemented on the mobile device 10 in response to measured ambient temperature. This example illustrates that when the ambient temperature is below 50 F.° the mobile device 10 may select and apply a Blue Glow theme which changes the color of the display 18 and keypad 20 backlights to blue to reflect the cool temperatures of the surroundings. This example also illustrates that when the ambient temperature falls between about 51 and 70 F.° the mobile device 10 may select and apply a Yellow Glow theme which changes the color of the display 18 and keypad 20 backlights of to yellow. This example further illustrates that when the temperatures exceeds above 71 F.° the mobile device 10 may select to apply a Red Glow theme which changes the backlight color of the display 18 and keypad 20 to red to reflect the hot surrounding temperatures.

Figure 9:
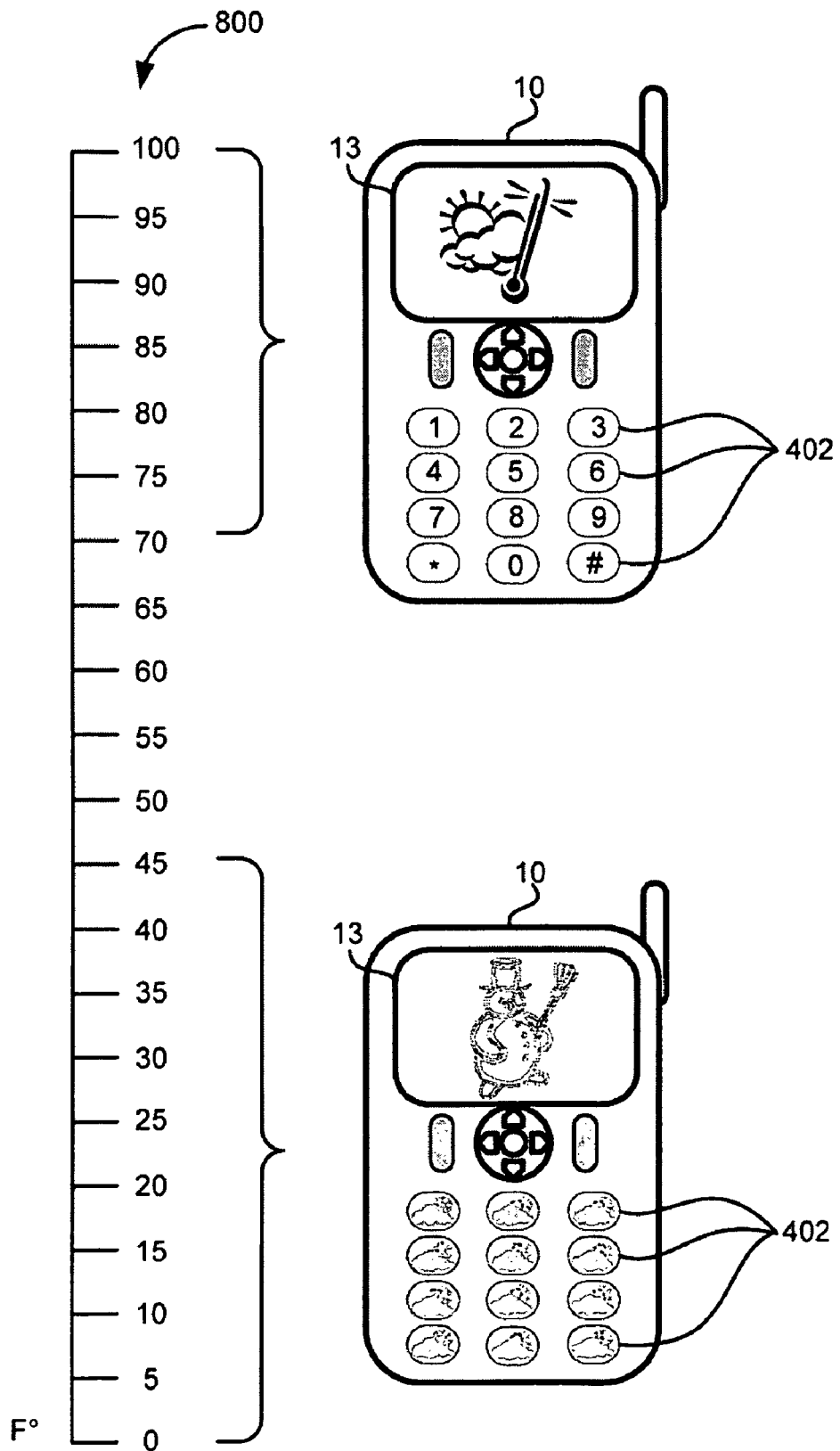
FIG. 9 is an illustration of an embodiment presenting theme changes on a mobile device based on temperature.

In another exemplary embodiment illustrated in FIG. 9, data from temperature sensor 38 may be used to change the theme of a mobile device 10 by showing images related to the surrounding temperatures. This embodiment is illustrated in FIG. 9 in the form of a temperature scale 800 from 0 to 100 F.° and examples of themes images that may be displayed on the mobile device 10 in response to measured ambient temperature. This example illustrates that when the temperature sensor 38 detects a cold ambient temperature, such as below 45 F.°, the system software 202 may select a theme image relating to cold weather to be displayed on the mobile device 10. For example, at temperatures below 45 F.° the display 18 may show a snowman and the keys 402 on the keypad 20 may show snowing clouds. In contrast, for example, when the temperature exceed 71 F.° the display 18 may present an image of the sun and a mercury thermometer indicating high temperatures while the keys 402 of the keypad 20 may display a bright yellow glow (not shown) to suggest bright sunshine.

Figure 10:
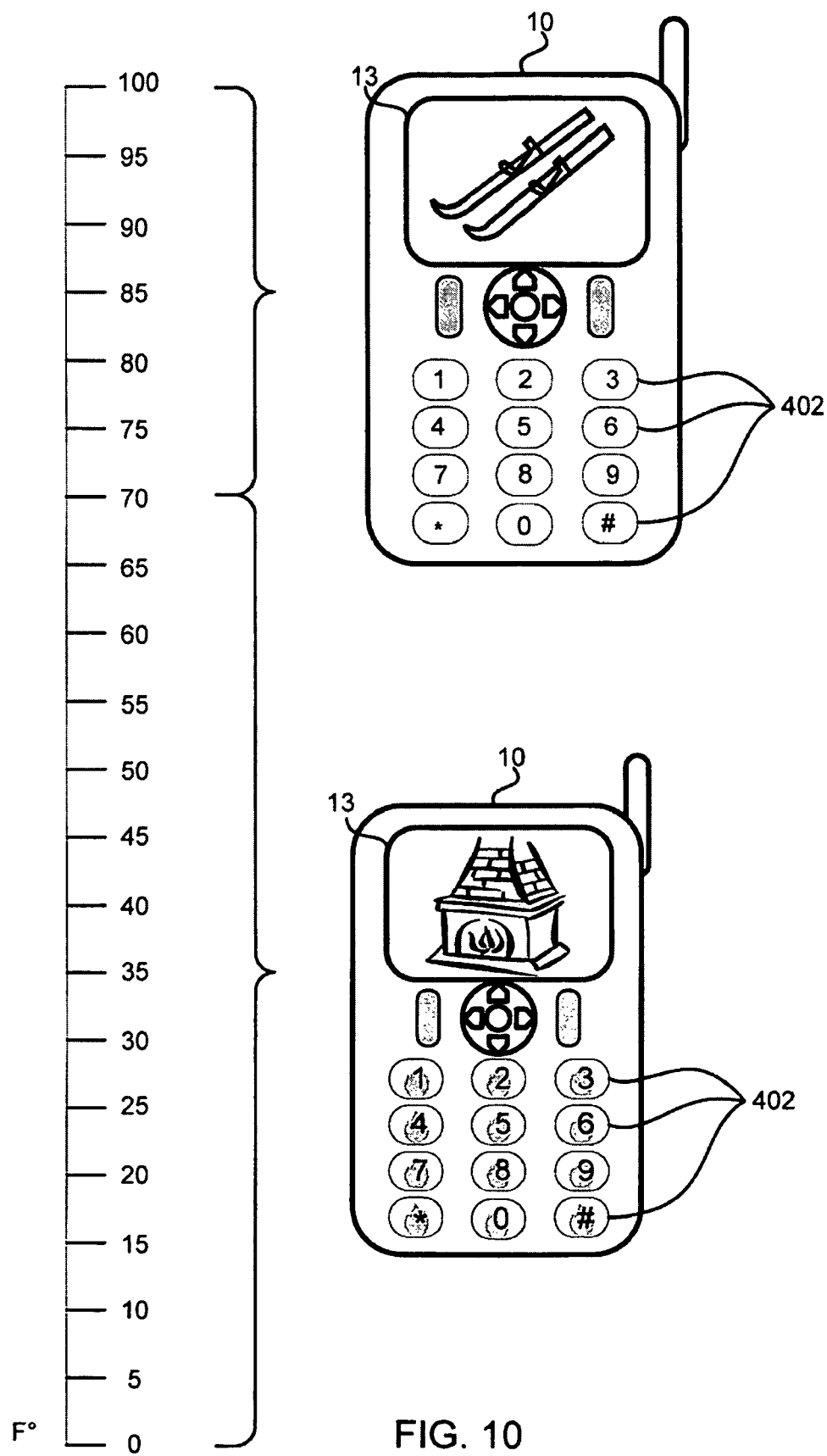
FIG. 10 is an illustration of another embodiment presenting theme changes on a mobile device based on temperature.

Alternatively, users may set the themes to be displayed on their mobile device 10 to suggest feelings opposite to those of the ambient temperatures. For example, the cold weather images may be presented when the measured temperature is high and warm weather images may be presented when the measured temperature is cold. Another example is illustrated in FIG. 10 which illustrates that when the ambient temperature is below 70 F.° the processor may select an image of a fireplace to present on the display 18 and flames on the keys 402 of the keypad 20 to suggest a warm feeling to the user. Similarly, when the temperature is above 71 F.°, the processor 12 may select and apply a ski theme to show an image of a pair of skis on the display 18 and bright White Glow (not shown) on the keys 402 of the keypad 20 to suggest cool feelings to the user.

Other types of sensors 200 may also be used individually or in combination with other sensors 200 to affect the theme selection in a mobile device 10. For example, data collected by a breath alcohol sensor 44 may be used by the system software 202 to determine whether the user is under the influence of an alcoholic beverage and apply a theme that enlarges the font size of the numbers on the display 18 and the keys 402 of the keypad 20 (not shown). As another example, data from a GPS receiver 43 may be used in combination with data from a temperature sensor 38 to select the theme of the mobile device 10. For example, if the GPS data indicates that the user is by a beach (such as determined by comparing GPS coordinates to a global map stored in memory) and the temperature sensor 38 measures a warm ambient temperature, the processor 12 may change the theme to show an ocean view on the display 18 and waves on the keys 402 of the keypad 20.

Figure 11:
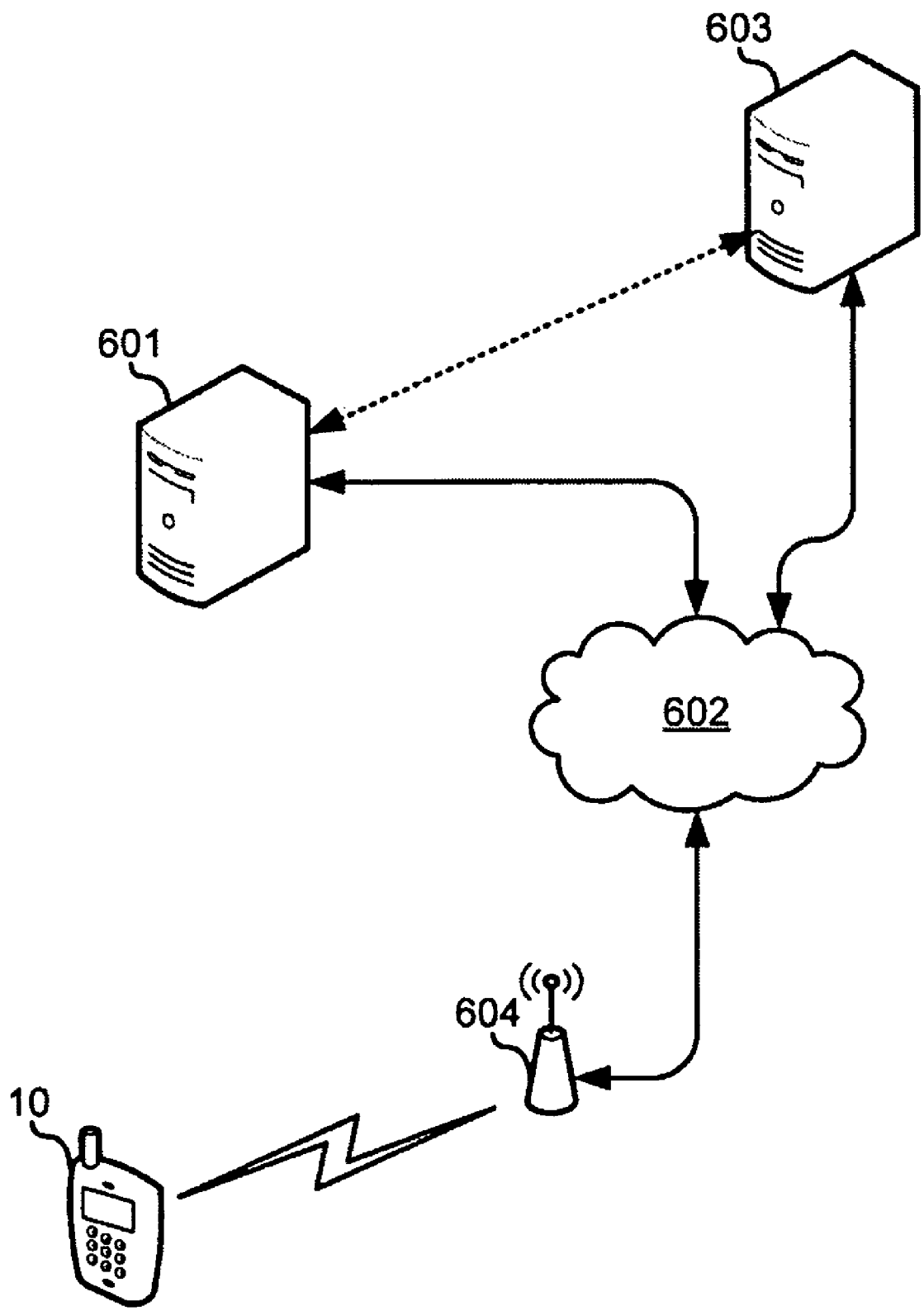
FIG. 11 is a network diagram of an embodiment suitable for sending advertisement to a mobile device based on data collected by a sensor.

In an embodiment, the data collected by sensors 200 may also be used to customize advertisements transmitted to the mobile device 10. As illustrated in FIG. 11, the sensor 200 data may be collected by sensors on a mobile device 10 and transmitted via the Internet 602 to a advertisement server 601 configured by software to create and transmit advertisements based on received sensor 200 data. An advertisement requesting application may be implemented on the processor 12 to formulate messages transmitted to and received from the advertisement server 601, as well as processing such messages to extract advertisements for display as mobile device themes. As shown in FIG. 11, the mobile device 10 communicates the sensor 200 data to a wireless access point 604 using well known wireless data network protocols and technology (e.g., cellular or WiFi data network technology). The data is then sent to a network 602, such as the Internet which conveys the data to the server 600. The server 600 may also be connected to a local merchant, advertiser or coupon owner server 603, via the Internet 602 or optionally via a direct network connection (shown by a dashed arrow) for receiving targeted advertising information or coupons. The advertisement server 601 receives and processes the received sensor 200 data. Using the sensor data, the advertisement server 601 may select and/or customize an advertisement related to or triggered by the sensor data. Alternatively, the server 600 may provide some or all of the sensor data within query to a merchant, advertiser or coupon owner server 603 inquiring whether any advertisement or coupon should be transmitted to the mobile device 10. Once a targeted advertisement is configured, the server 600 transmits that advertisement to the mobile device 10 via the same communication path, i.e. the network 602 and the wireless access point 604. The advertisement will then be shown on the mobile device 10. It should be noted that the theme data base server 600 illustrated in FIG. 6 may also function as the advertisement server 601 illustrated in FIG. 11.

The system architecture illustrated in FIG. 11 enables a new business entity in the form of a centralized advertising service provider operating an advertisement server 601. Using telecommunication networks, mobile devices 10 may be located anywhere when they report their sensor data to the server 601. Thus, operating the server 601 as a centralized service makes business and network sense. However, advertisements, particular coupon based advertisements, are likely to be regionally or locally focused. For example, restaurant operators in Vale, Colo. will not be interested in offering a coupon for free hot chocolate to mobile device users outside of Colorado. To enable the personalized advertising to be locally focused without requiring the advertisement server 601 to maintain a nation-wide database of advertisements, the advertisement server 601 can communicate with a merchant, advertiser or coupon owner server 603 that is located in the vicinity of the mobile device 10.

Information regarding the location of the mobile device 10 may be communicated to the advertisement server 601 either as sensor data (e.g., GPS location information) or as information provided by the cellular network operator along with the sensor data transmission. Using this location information, the advertisement server 601 can determine (e.g., by using a look up table) the local merchant, advertiser or coupon owner server 603 or servers which may have targeted advertising to communicate. Such local merchant, advertiser or coupon owner server 603 may be businesses which contract with the advertisement server 601 owner to deliver localized and targeted advertising. The communication to the merchant, advertiser or coupon owner server 603 may include the sensor data, a summary of the sensor data (e.g., temperature is cold), or just the sensor data of interest to the merchant, advertiser or coupon owner server 603. Using that information, the local merchant, advertiser or coupon owner server 603 may generate an advertisement or coupon and relay that information to the advertisement server 601 for delivery to the mobile device 10. In an alternative embodiment, the advertisement server 601 may redirect the data connection with the mobile device 10 so that the advertisement information is communicated directly from the local merchant, advertiser or coupon owner server 603 to the mobile device, with the advertisement server 601 serving the role of a dispatcher or communication switch.

Sensor 200 data sent to the advertisement server 601 may include personalized data about the user and specifications of the mobile device 10, or a device identifier (as illustrated in FIG. 7) sufficient to enable the advertisement server 601 to look up the technical specifications of the request mobile device. The personalized data may include browsing history, name, age, address, transmitting cellular cite, etc. Such personalized data may be used by the advertisement server 601 to select an appropriate advertisement for the user of the mobile device 10. The specification data (either transmitted or available for look up using a device ID) may include the mobile device 10 model, display 18 dimensions, keypad 20 capabilities, software capabilities, etc. The mobile device 10 specification data may be used by the server 600 to transmit advertisements that can be viewed on the mobile device 10. For example, if the mobile device 10 is capable of processing motion pictures, the server 600 may transmit a video clip advertisement to the mobile device 10. Alternatively, if the mobile device 10 is only capable of receiving and showing text advertisements, then the server 600 may transmit the advertisement in text format.

Figure 12:
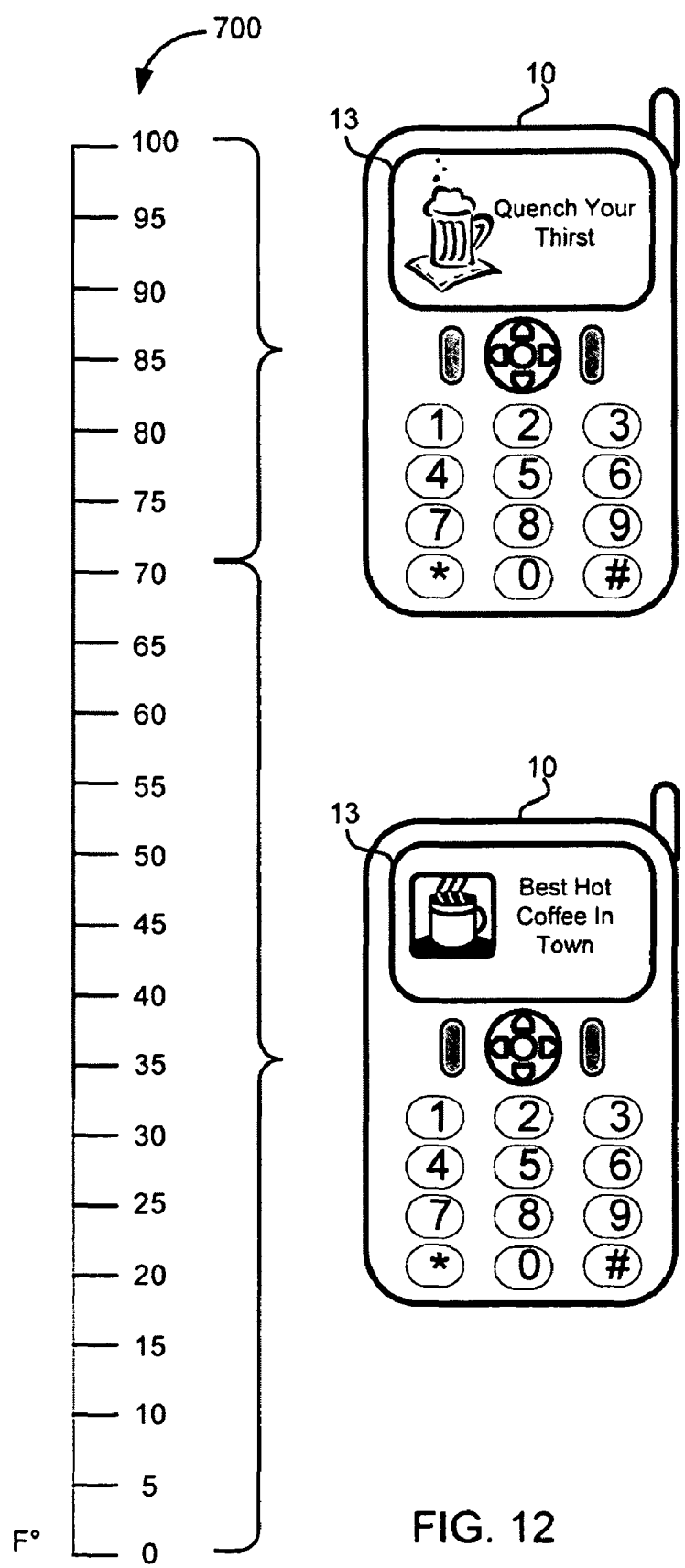
FIG. 12 is an illustration of an embodiment presenting sending advertisement to a mobile device based on data collected by a temperature sensor.

In an exemplary embodiment illustrated in FIG. 12, data from a temperature sensor 38 may be sent to the advertisement server 601 for. When the data from the temperature sensor 38, user preferences and mobile device 10 specification are received, the advertisement server 601 may select, customize and transmit an advertisement to the mobile device 10. If the advertisement server 601 is connected (e.g., by network and contract agreements) to a local merchant server 603, the advertisement server 601 may provide some of the information, such as the temperature data or just the fact that a mobile device in the vicinity of the local merchant has reported a temperature within an advertisement criteria set by the merchant. In response, the merchant server 603 may send at least a portion of an advertisement to the advertisement server 601 for delivery to the mobile device 10. The advertisement server 601 may then use the advertisement information received from the merchant server 603 in conjunction with the user preference and mobile device specification information received from the mobile device 10 to generate a customized or personalized advertisement for transmission.

Customized or personalized advertisements may be transmitted from the advertisement server 601 to the mobile device 10 using the same wireless network. The advertisement data may be in the form of simple text, complex graphics, images, animation or video clips depending on the mobile device's processing capabilities. For example, as illustrated in FIG. 12, if the mobile device reports to the advertisement server 601 that the measured temperature is below 70 F.°, the advertisement server 601, optionally working in conjunction with a local merchant server 603, may send an advertisement concerning hot steaming coffee to entice the user to purchase a coffee drink, such as from a local coffee house. Similarly, if the mobile device reports to the advertisement server 601 that the measured temperature is above 71 F.°, the advertisement server 601 may send an advertisement about cold beer, such as a location of a nearby pub or bar using information provided by a local merchant server 603.

Combining data from multiple sensors 200 may allow the advertisement server 601 to provide more specific advertisements to users. For example, if the mobile device reports to the advertisement server 601 that the measured temperature is above 70 F.°, the combination of that information with GPS data also reported by the mobile device would allow the advertisement server 601 to provide the user advertisement data for a cold beer at a vendor in the vicinity of the user's location. Mobile device location information may also be obtained from the wireless network, such as by using the location of the cellular or WiFi base station through which the mobile device is connected. As another example, if accelerometer data is also reported to the advertisement server 601 along with temperature and GPS data, the advertisement generated by the advertisement server 601 may reflect calculations about the time it will take the user to reach the advertised destination. For example, if the accelerometer data indicates the mobile device user is most likely walking, the advertisement server 601 can expect that it will take longer for the user to arrive at a particular location than if the accelerometer data indicates that the mobile device is in a moving automobile.

Figure 13:
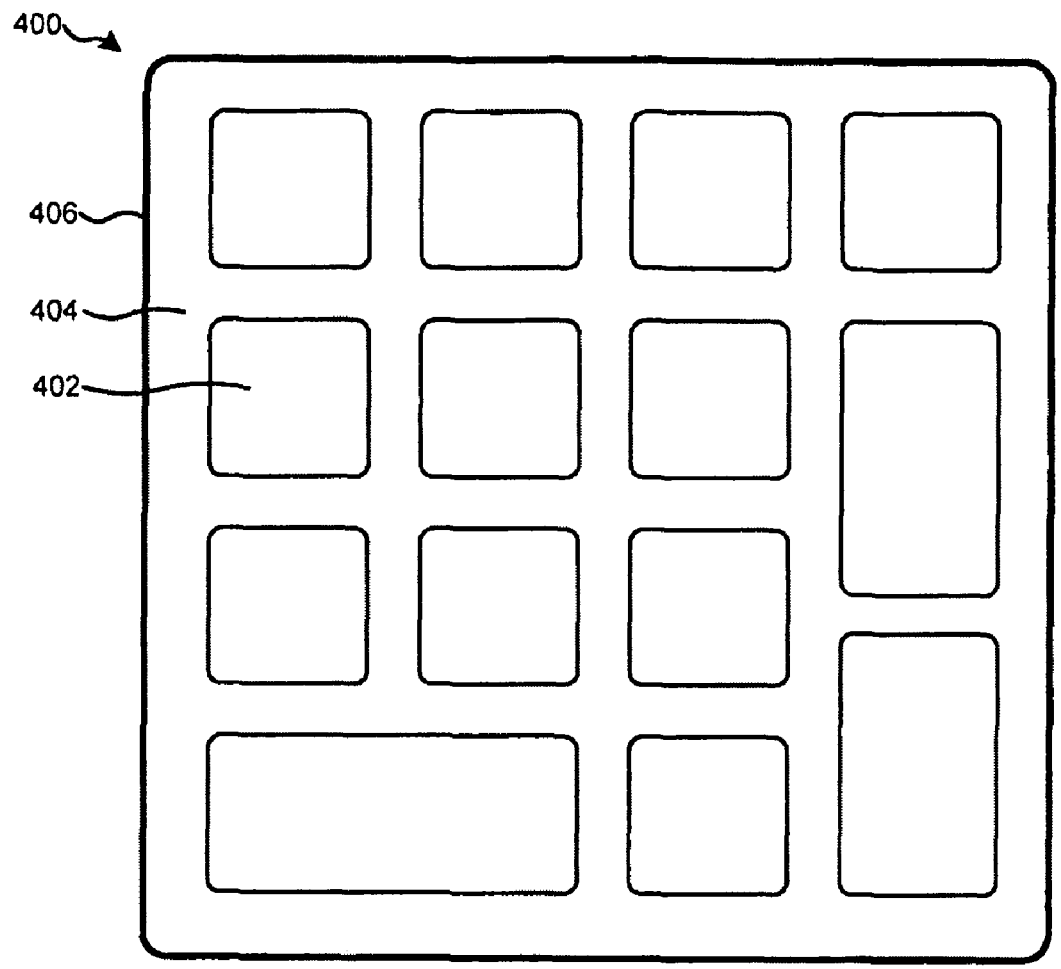
FIGS. 13 and 14 are top view and cross-sectional view, respectively, of a keypad employing display keys.
Figure 14:
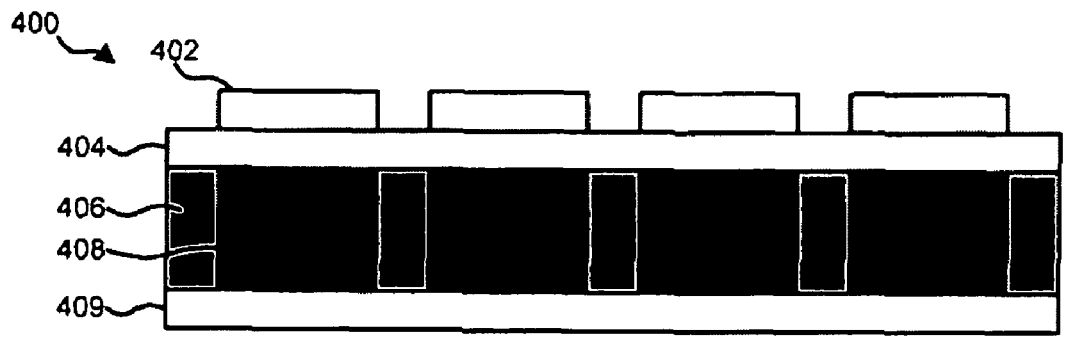

In the various embodiments, theme that requires changing the layout or functionality of the keypad 20 may be implemented on configurable keypad technologies. An example of a configurable keypad technology is illustrated in FIGS. 13 and 14 in which each key has associated with it a small display allowing the key to be labeled dynamically. Such a display-key keypad 400 may include transparent keys 402 positioned within a framework 404 and supported by a support structure 406. A display 408 beneath each transparent key 402 can be controlled by the mobile device processor 12 to present a free-form image viewable through the key 402. A bottom structure 410 may provide support for the displays 408 as well as electrical connections for coupling the displays to the processor 12.

A display-key keypad 400 can provide many advantages to mobile devices 10 since individual key functions can be communicated to users by the images presented on the keys 402 themselves. Thus, theme colors or images, words, numbers or symbols or graphics can be displayed in the key itself. In order to enable such a keypad to be easily implemented, applications can define the function associated with each key 402 as well as provide graphics that are presented on each of the key displays 408. This additional complexity along with the implementation of keypad themes can be facilitated by a keypad protocol as described above.

Figure 15:
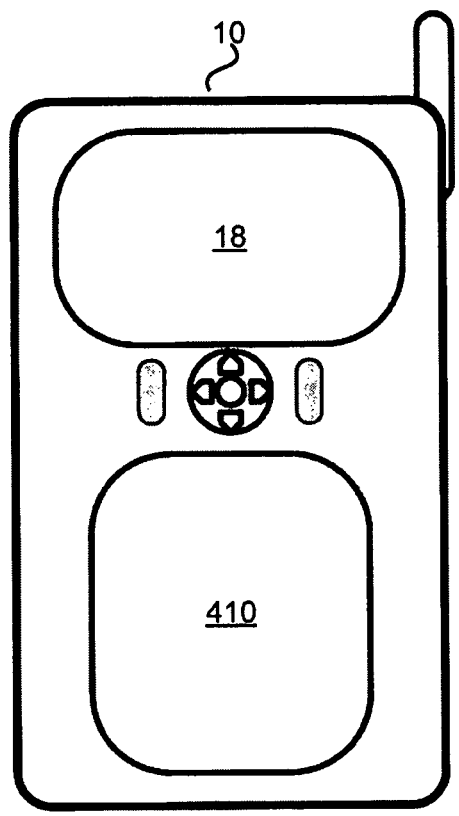
FIGS. 15 and 16 are illustrations of a cell phone including a touchscreen user-interface.
Figure 16:
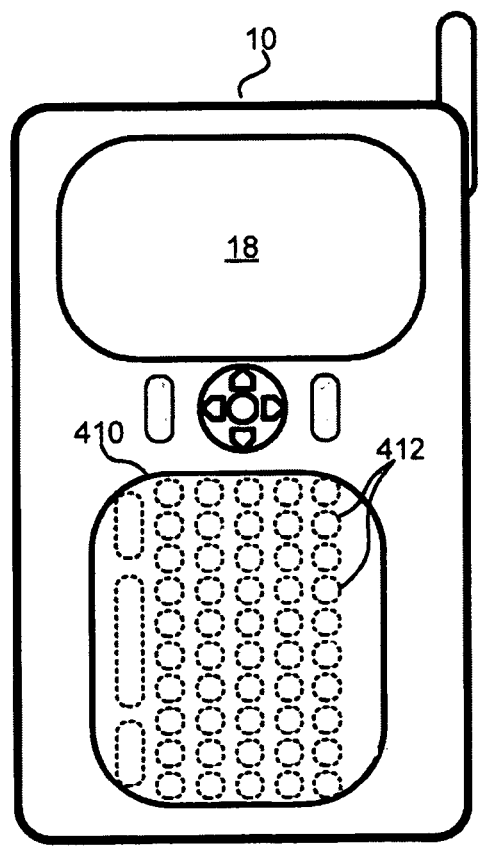

Another form of mobile device keypad/user-interface is a touchscreen, such as illustrated in FIGS. 15 and 16. In such a mobile device 10, a touchscreen 410 provides a completely flexible keypad and user-interface. Touchscreen displays provide great flexibility for creating user-interfaces that are completely configurable. Without the benefits of the keypad protocol (described above), this flexibility will impose additional complexity on application software. The keypad protocol can simplify the development display/keypad configurations for touchscreens. Instead of having to configure specific touchscreens to display various themes within an application software, application developers can provide descriptive configuration information and graphic files to the keypad protocol using standard formats and APIs, leaving the complexity of displaying themes and interfacing with the variety of touchscreen designs to the keypad protocol. In this manner, theme implementation can be accomplished by system software without imposing additional complexity requirements on application software.

Figure 17:
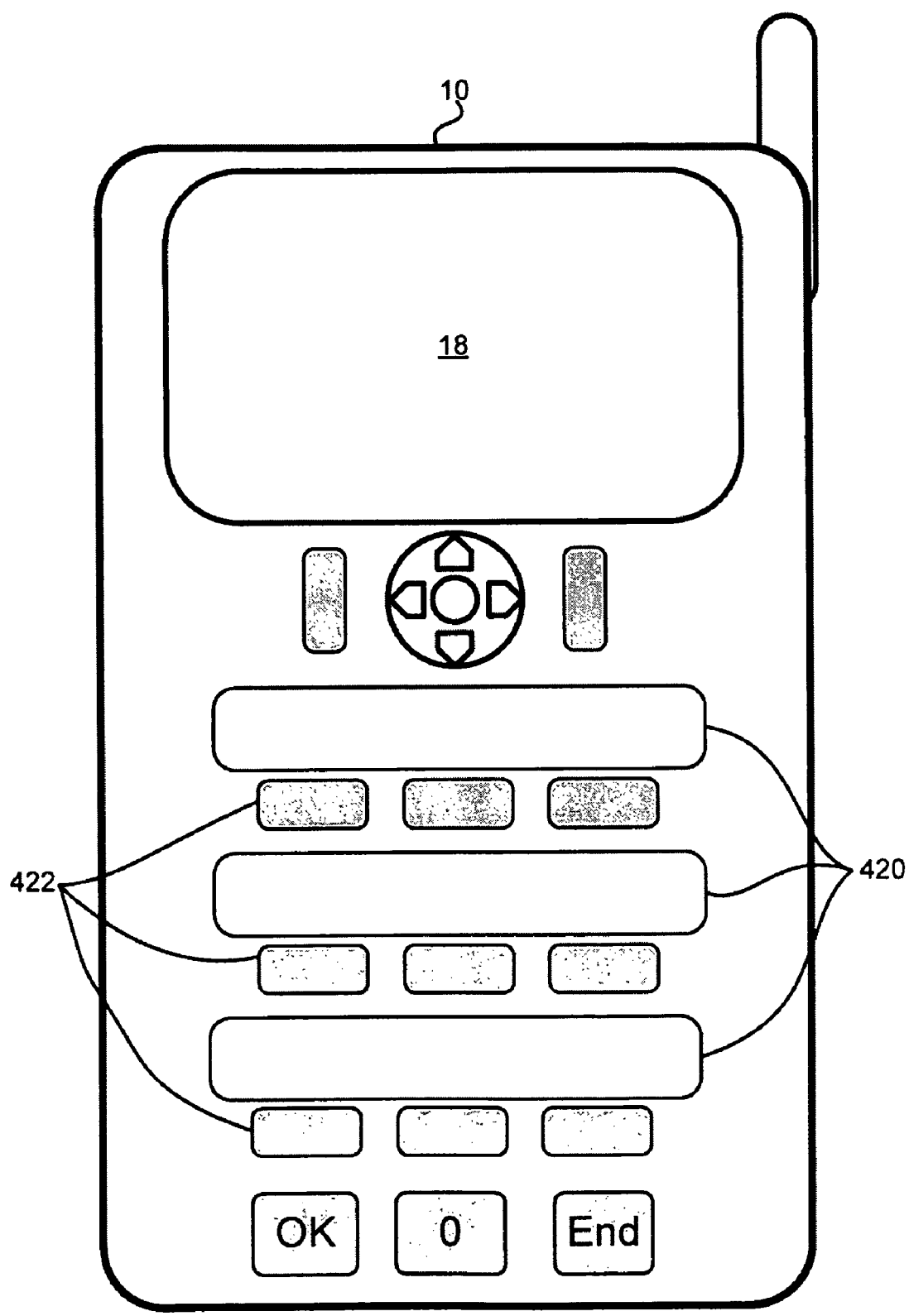
FIG. 17 is an illustration of a cell phone including display positioned above keys.

A third form of keypad 20 that may be employed on future mobile devices 10 is illustrated in FIG. 17. In this keypad configuration, small displays 420 are positioned above, beside or beneath hard keys 402 so that key function definitions can be presented on the small displays. The small displays 420 may be liquid crystal displays similar to the main mobile device display 18. An example of such a keypad display is disclosed in U.S. Pat. No. 6,703,963, the entire contents of which are hereby incorporated by reference. The small displays 420 are coupled to the mobile device processor 12 so that the displays 420 can be controlled via system software 202. This keypad design is highly flexible since it enables keys to be dynamically assigned with the key function communicated to users in the form of graphics or alphanumeric characters. As with other display concepts, the presentation of selected themes can be implemented in system software such as by a keypad protocol as described above.

Figure 18:
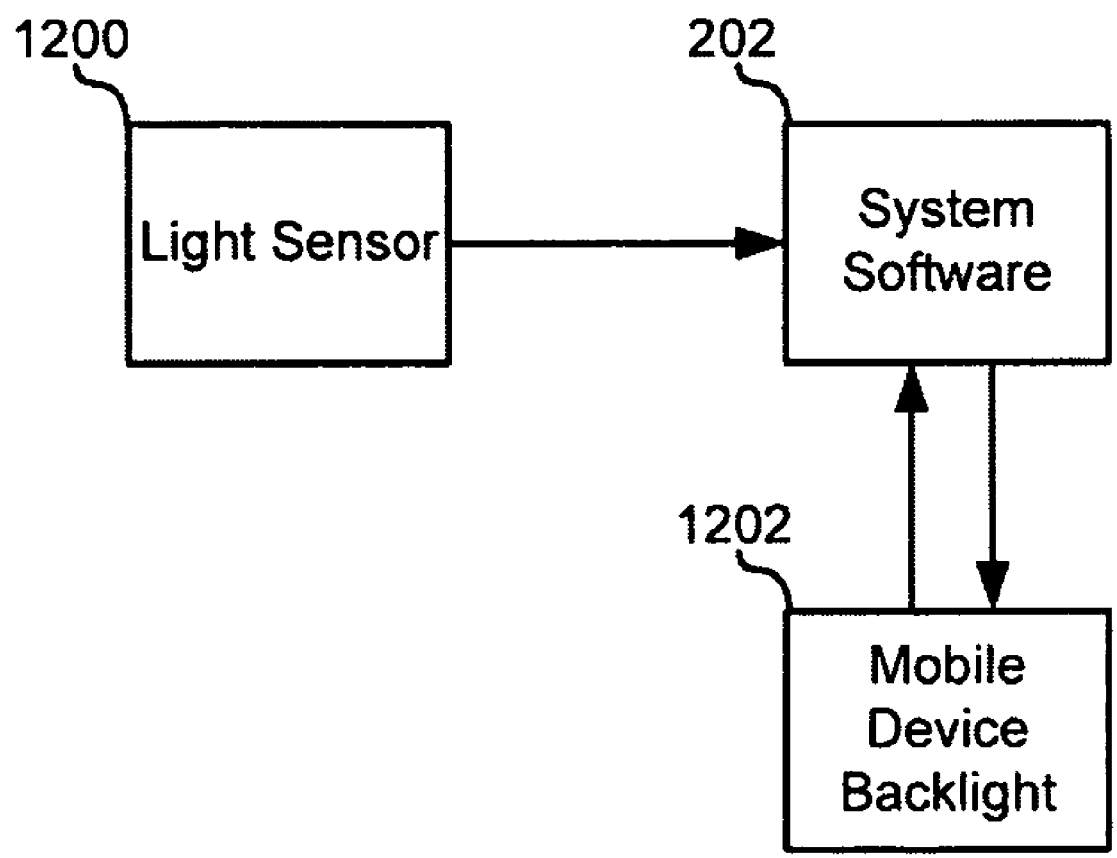
FIG. 18 is a hardware/software architecture diagram of an embodiment including a light sensor.

As a further example embodiment illustrated in FIG. 18, the mobile device 10 may be configured to adjust the mobile device backlight 1202, such as display 18 and keypad 20 backlights, based on data received from an ambient light sensor 36. Adjusting the mobile device backlight 1202 allows the mobile device to conserve energy to extend battery life while ensuring the display and keypads are viewable within the ambient light conditions. As shown in FIG. 18, data collected by a light sensor 36 may be sent to the system software 202 where the data can be used to select a theme or adjust the mobile device backlight 1202.

Figure 19:
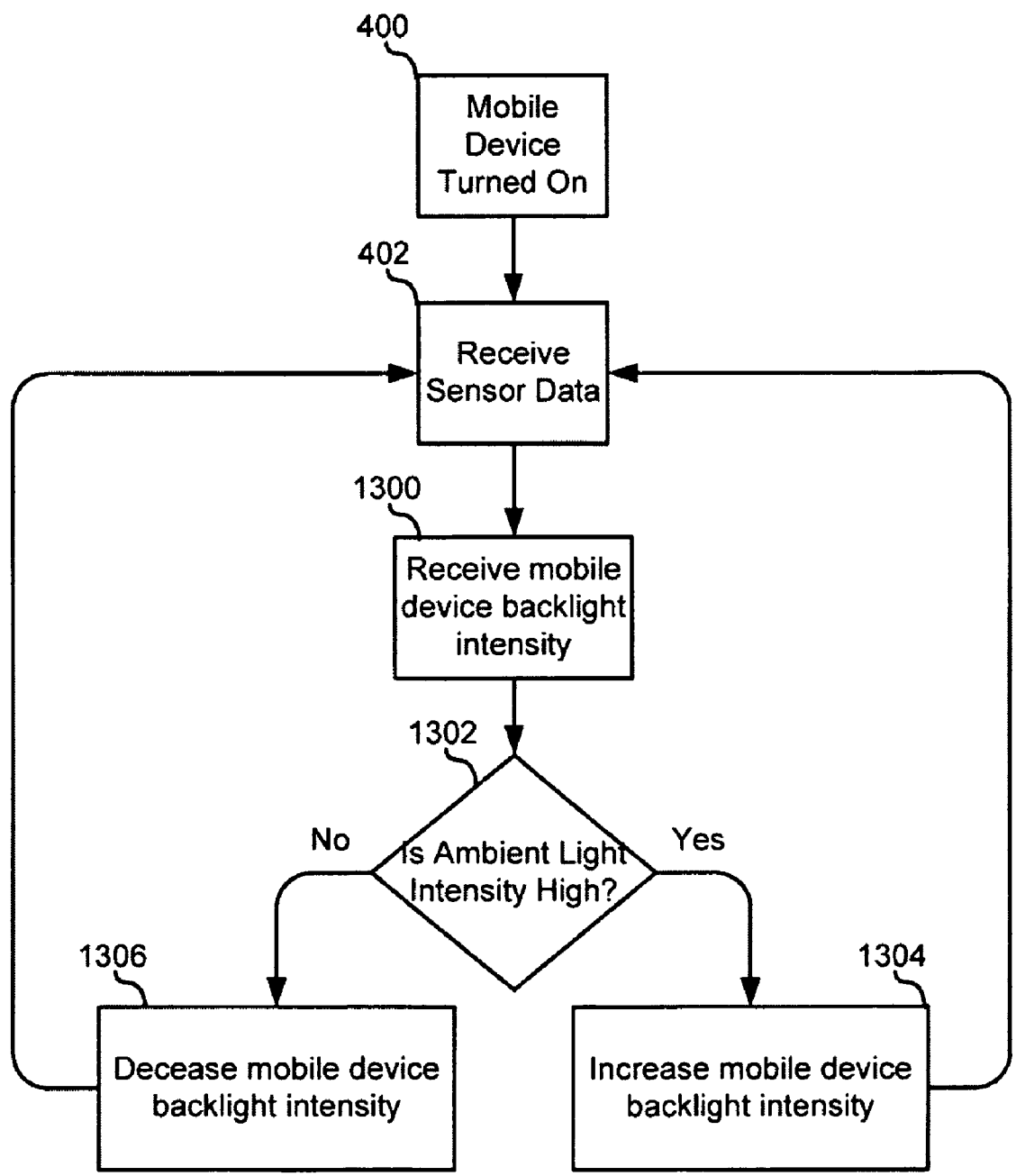
FIG. 19 is a process flow diagram of an embodiment method for controlling backlight intensity based upon a light sensor.
Figure 20:
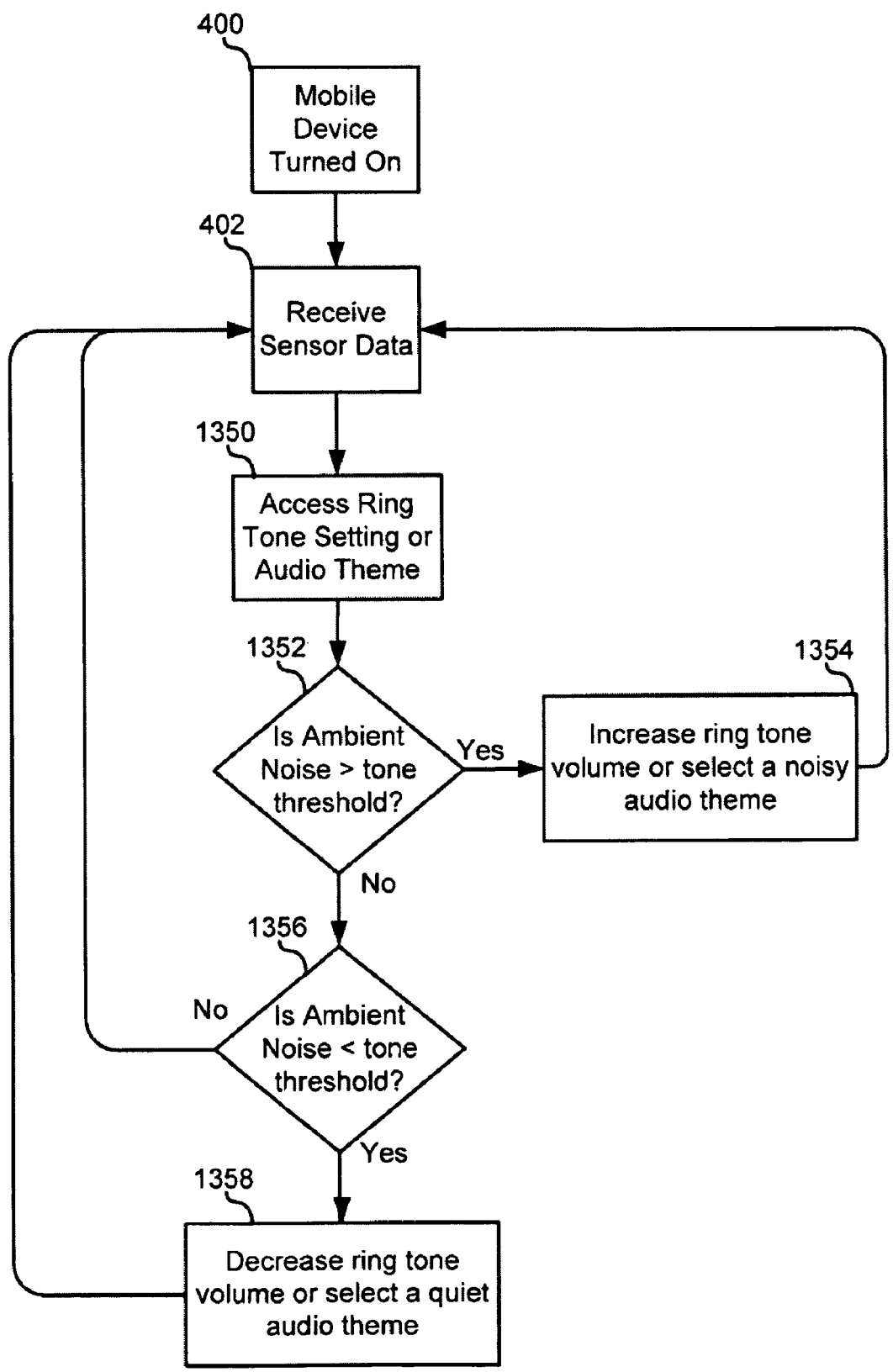
FIG. 20 is a process flow diagram of an embodiment method for controlling ring tone volume or audio themes based upon an ambient noise sensor.

FIG. 19 illustrates a process flow diagram of example steps that may be implemented in adjusting the mobile device backlight 1202 based on data received from an ambient light sensor 36. When the mobile device 10 is turned on, step 400, the processor 12 configured by system software 202 receives data collected by the ambient light sensor 36, step 402. The processor 12 may also access data regarding the intensity setting of the mobile device backlight 1202, step 1300. By comparing the measured ambient light to the backlight intensity setting, test 1302, the processor can determine whether an adjustment should be made to the backlight intensity setting to conserve energy. If the ambient light sensor 36 measures bright ambient light (i.e., test 1302="Yes"), the processor may be configured to increase the intensity of the mobile device backlight 1202, step 1304. Alternatively, if the ambient light sensor 36 records low intensity ambient light (i.e., test 1302="No"), the processor may decrease the intensity setting of the mobile device backlight 1202, step 1306. The processor may also not make any adjustment to the backlight intensity. With the backlight intensity adjusted, the processor may return to receiving sensor data, returning to step 402. Using this embodiment, the brighter the ambient light, the brighter the mobile device backlight 1202, while the dimmer the ambient light, the dimmer the mobile device backlight 1202. Such automatic adjustments in the mobile device backlight 1202 allow users to be able to easily view the display 18 while enjoying longer battery life.

Another embodiment may be implemented using example method steps illustrated in FIG. 19 in order to enable a mobile device to adjust ring tone volumes or audio themes in response to ambient noise. In this embodiment, an ambient noise sensor can use an ambient noise sensor 34 (e.g., a microphone) to report to the processor a measure of ambient noise when the processor receives sensor data, step 402. The processor may then access the ring tone volume setting and/or the audio theme currently activated on the mobile device, step 1350. The processor may then compare the measured ambient noise level to a maximum threshold value, test 1352. If the ambient noise exceeds a maximum threshold corresponding to the present ring tone volume setting and/or the audio theme, this indicates that the environment may be too loud for those settings such that a user may not hear a ring or other audio alarm. In that event (i.e., test 1352="Yes"), the processor may increase the ring tone volume setting or select a louder audio theme from themes stored in memory that more appropriately matches the ambient noise level, step 1354. With the volume or audio theme adjusted, the processor may return to receiving sensor data, returning to step 402. However, if the ambient noise sensor 34 records ambient noise below the maximum threshold (i.e., test 1352="No"), the processor may test whether the ambient noise is less than a minimum threshold value, test 1356. If the ambient noise is less that the minimum threshold corresponding to the present ring tone volume setting and/or the audio theme, this indicates that the environment may be too quiet for those settings such that a ring or other audio alarm would be inappropriately too loud. In that event (i.e., test 1356="Yes"), the processor may decrease the ring tone volume setting or select a quieter audio theme from themes stored in memory that more appropriately matches the ambient noise level, step 1358. With the volume or audio theme adjusted, the processor may return to receiving sensor data, returning to step 402. If the measured ambient noise level falls between the minimum and maximum threshold values (i.e., tests 1352 and 1356 both="No"), the processor need not adjust the volume or change the audio theme so processing can return to receiving sensor data, returning to step 402. This embodiment allows the mobile device to adjust the volume and type of audio themes consistent with the ambient noise environment.

Figure 21:
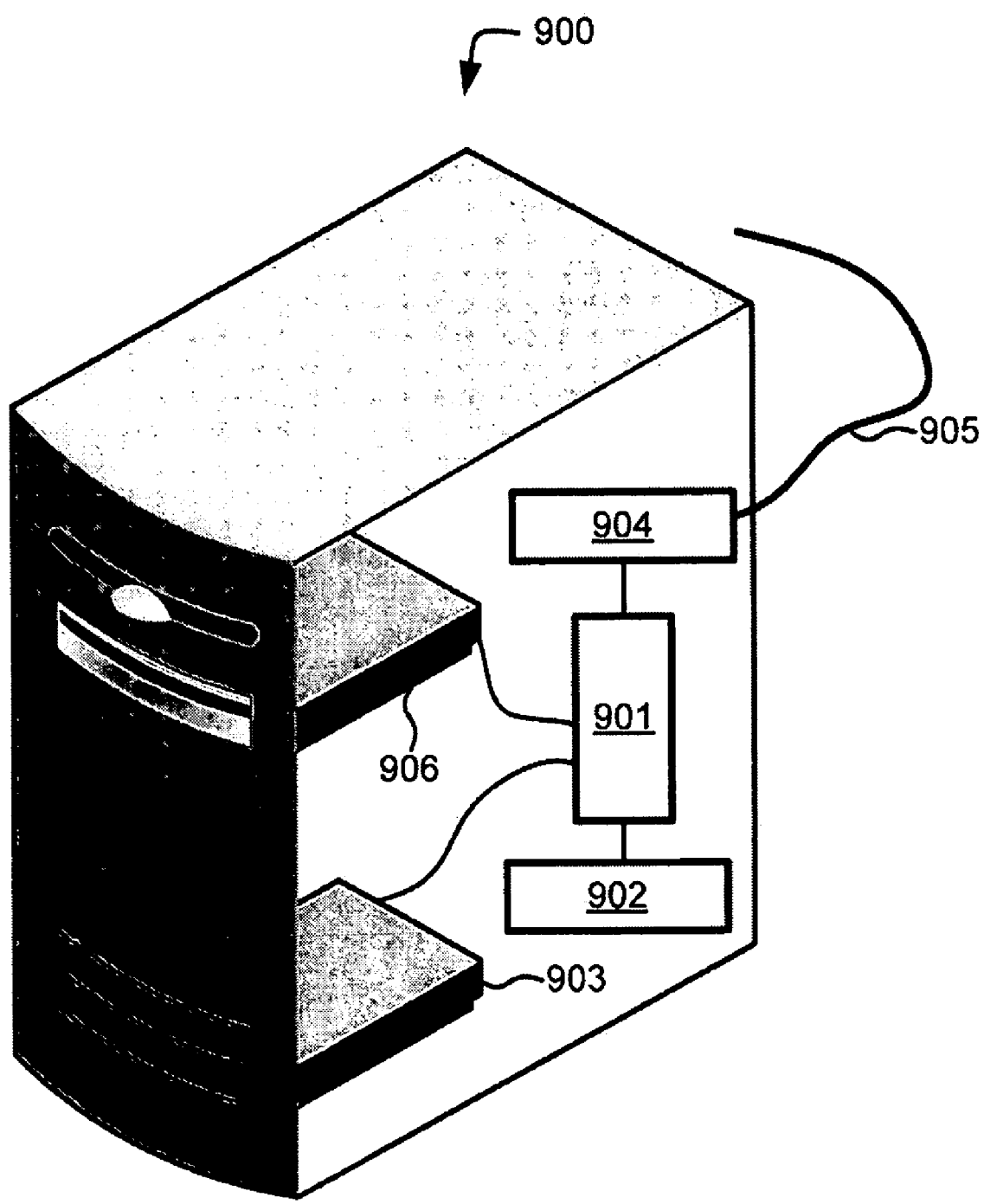
FIG. 21 is a component block diagram of a typical server usable with the various embodiments.

The embodiments described above involving servers may be implemented on any of a variety of commercially available server systems such as illustrated in FIG. 21. Such a server 900 typically includes a processor 901 coupled to volatile memory 902 and a large capacity nonvolatile memory, such as a disk drive 903. The processor 901 is coupled to one or more network interface circuits, such as high speed modems 904 coupled to a network 905 such as the Internet. The server 900 may also include a portable media reader, such as a compact disc (CD) drive 906 coupled to the processor 901.

The various embodiments may be implemented by the processor 12 executing software instructions configured to implement one or more of the described methods. Such software instructions may be stored in memory 14 as the device's operating system software, a series of APIs implemented by the operating system, or as compiled software implementing an embodiment method. Further, the software instructions may be stored on any form of tangible processor-readable memory, including: a random access memory 14, a memory module plugged into the mobile device 10, such as an SD memory chip, an external memory chip such as a USB-connectable external memory (e.g., a "flash drive"), read only memory (such as an EEPROM); hard disc memory, a floppy disc, and/or a compact disc.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for selecting a theme implemented on a computing device, comprising:
   receiving data collected by a sensor;
   selecting a theme based on the data collected by the sensor, wherein the theme is stored in a theme file comprising a theme element for changing a display of the computing device and a theme element for changing a keypad of the computing device; and
   applying the selected theme to the computing device to change the computing device display and the computing device keypad.

2. The method of claim 1, wherein the sensor is a temperature sensor.

3. The method of claim 2, wherein the step of applying the selected theme to the computing device comprises adjusting a color of a backlight.

4. The method of claim 1, wherein the theme file of the selected theme is stored on the computing device.

5. The method of claim 1, wherein the theme file of the selected theme is stored on a server.

6. The method of claim 5, further comprising:
   sending a request for the theme file of the selected theme to the server via a network; and
   receiving the requested theme file of the selected theme from the server via the network.

7. The method of claim 6, further comprising including information regarding the computing device in the request for the theme file of the selected theme.

8. The method of claim 1, wherein the step of selecting a theme based on the data collected by the sensor comprises selecting one of a plurality of themes using a theme list stored in memory of the computing device.

9. The method of claim 8, wherein the theme list includes theme criteria associated with each of the plurality of themes, and wherein the step of selecting a theme based on the data collected by the sensor further comprises comparing the data collected by the sensor to the theme criteria and selecting one of the plurality of themes for which the theme criteria is satisfied.

10. The method of claim 1, wherein the computing device includes a configurable keypad and the step of applying the selected theme to the computing device to change the computing device keypad includes applying the selected theme to the configurable keypad.

11. The method of claim 10, wherein the step of applying the selected theme to the configurable keypad is accomplished using a keypad protocol.

12. The method of claim 10, wherein the configurable keypad is a display-key keypad.

13. The method of claim 10, wherein the configurable keypad is a touchscreen keypad.

14. The method of claim 10, wherein the configurable keypad includes key displays positioned adjacent to the keys.

15. A method for presenting advertisements on a mobile computing device, comprising:
   receiving data collected by a sensor on the mobile computing device, wherein the sensor comprises at least one sensor selected from the group consisting of a temperature sensor, a vibration sensor, a noise sensor, a breath alcohol sensor, an accelerometer, and an ambient light sensor;
   the mobile computing device sending the data collected by the sensor along with a request for an advertisement to an advertisement server;
   the mobile computing device receiving an advertisement relating to the data collected by the sensor; and
   displaying the advertisement on the computing device.

16. The method of claim 15, wherein the sensor further comprises a second sensor selected from the group consisting of a location sensor, and a Global Positioning System receiver.

17. A method for providing advertisements to a mobile computing device, comprising:
   receiving from the mobile computing device a request for an advertisement including sensor data collected by a sensor coupled to the mobile computing device, wherein the sensor comprises at least one sensor selected from the group consisting of a temperature sensor, a vibration sensor, a noise sensor, a breath alcohol sensor, an accelerometer, and an ambient light sensor;
   generating an advertisement based on the sensor data; and
   sending the generated advertisement to the mobile computing device.

18. The method of claim 17, wherein the step of generating an advertisement based on the sensor data further comprises:
   receiving information regarding the position of the mobile computing device;
   requesting advertisement information from a server regarding advertisers located in the vicinity of the mobile computing device;
   receiving advertisement information from the server; and
   generating a customized advertisement using the received advertisement information.

19. The method of claim 18, wherein the step of advertisement information further comprises forwarding the received sensor data to the server.

20. A computing device, comprising:
a processor;
a sensor coupled to the processor
a display coupled to the processor;
a keypad coupled to the processor; and
a memory coupled to the processor,
wherein the processor is configured with software instructions to perform steps comprising:
receiving data collected by the sensor;
selecting a theme based on the data collected by the sensor, wherein the theme is stored in a theme file comprising a theme element for changing a display of the computing device and a theme element for changing a keypad of the computing device; and
applying the selected theme to the computing device display to change the display and the keypad.

21. The computing device of claim 20, wherein the sensor is a temperature sensor.

22. The computing device of claim 21, further comprising a backlight, wherein:
the processor is configured with software instructions to perform further steps comprising adjusting a color of a backlight based on data collected by the temperature sensor.

23. The computing device of claim 20, wherein the theme file of the selected theme is stored in the memory.

24. The computing device of claim 20, further comprising a network interface circuit coupled to the processor, wherein the processor is configured with software instructions to perform steps further comprising:
sending a request for the theme file of the selected theme to a server via the network interface circuit; and
receiving the requested theme file of the selected theme from the server via the network interface circuit.

25. The computing device of claim 24, wherein the network interface circuit comprises a wireless transceiver configured to transmit and receive data via a wireless data network.

26. The computing device of claim 20, wherein:
the memory has stored therein a theme list identifying a plurality of themes and including theme criteria associated with each of the plurality of themes; and
the processor is configured with software instructions to perform the step of selecting a theme by performing steps comprising comparing the data collected by the sensor to the theme criteria and selecting one of the plurality of themes for which the theme criteria is satisfied.

27. The computing device of claim 20, wherein the keypad is a configurable keypad and the processor is configured with software instructions such that applying the selected theme to the computing device to change the keypad comprises applying the selected theme to the configurable keypad.

28. The computing device of claim 27, wherein the software configuring the processor includes a keypad protocol.

29. The computing device of claim 27, wherein the keypad is a display-key keypad.

30. The computing device of claim 27, wherein the keypad is a touchscreen keypad.

31. The computing device of claim 27, wherein the keypad includes key displays positioned adjacent to the keys.

32. A mobile computing device comprising:
a processor;
a display coupled to the processor;
a sensor coupled to the processor, wherein the sensor comprises at least one sensor selected from the group consisting of a temperature sensor, a vibration sensor, a noise sensor, a breath alcohol sensor, an accelerometer, and an ambient light sensor;
a network interface circuit coupled to the processor; and
a memory coupled to the processor,
wherein the processor is configured with software instructions to perform steps comprising:
receiving data collected by the sensor;
sending the data collected by the sensor along with a request for an advertisement to an advertisement server via the network interface circuit;
receiving an advertisement relating to the data collected by the sensor from the server via the network interface circuit; and
displaying the advertisement data on the display.

33. The computing device of claim 32, wherein the sensor further comprises a second sensor selected from the group consisting of a location sensor, and a Global Positioning System receiver.

34. The computing device of claim 32, wherein the network interface circuit comprises a wireless transceiver configured to transmit and receive data via a wireless data network.

35. A server configured to customize and distribute advertisements to a mobile computing device via a network, comprising:
a server memory;
a server processor coupled to the server memory; and
a network connection coupled to the server processor,
wherein the server processor is configured with software instructions to perform steps comprising:
receiving from the mobile computing device via the network connection a request for an advertisement including data collected by a sensor coupled to the mobile computing device, wherein the sensor comprises at least one sensor selected from the group consisting of a temperature sensor, a vibration sensor, a noise sensor, a breath alcohol sensor, an accelerometer, and an ambient light sensor;
generating an advertisement based on the sensor data; and
sending the generated advertisement to the mobile computing device via the network interface.

36. The server of claim 35, wherein the processor is configured with software instructions to perform further steps comprising:
requesting advertisement information from a merchant server regarding advertisers located in the vicinity of the mobile computing device;
receiving advertisement information from the merchant server; and
generating the advertisement using the received advertisement information.

37. A non-transitory storage medium having stored thereon processor-executable software instructions configured to cause a processor of a computing device to perform steps comprising:
receiving data collected by a sensor;
selecting a theme based on the data collected by the sensor, wherein the theme is stored in a theme file comprising a theme element for changing a display of the computing device and a theme element for changing a keypad of the computing device; and applying the selected theme to the computing device to change the computing device display and the computing device keypad.

38. The non-transitory storage medium of claim 37, wherein the tangible storage medium has stored thereon processor-executable software instructions configured to cause a processor of a computing device to receive data collected by a temperature sensor.

39. The non-transitory storage medium of claim 38, wherein the tangible storage medium has stored thereon processor-executable software instructions configured to cause a processor of a computing device performing steps further comprising:
adjusting a color of a backlight based on data collected by the temperature sensor.

40. The non-transitory storage medium of claim 37, wherein the tangible storage medium has stored thereon processor-executable software instructions configured to cause a processor of a computing device to select a theme with a theme file stored on the computing device.

41. The non-transitory storage medium of claim 37, wherein the tangible storage medium has stored thereon processor-executable software instructions configured to cause a processor of a computing device to perform further steps comprising:
sending a request for the theme file of the selected theme to a server via a network interface circuit; and
receiving the requested theme file of the selected theme from the server via the network interface circuit.

42. The non-transitory storage medium of claim 41, wherein the tangible storage medium has stored thereon processor-executable software instructions configured to cause a processor of a computing device to perform further steps comprising communicating with the server via a wireless data network.

43. The non-transitory storage medium of claim 37, wherein the tangible storage medium has stored thereon processor-executable software instructions configured to cause a processor of a computing device to select a theme by performing steps comprising:
comparing the data collected by the sensor to theme criteria included in a theme list stored in memory, the theme list identifying a plurality of themes; and
selecting one of the plurality of themes for which the theme criteria is satisfied.

44. The non-transitory storage medium of claim 37, wherein the wherein the tangible storage medium has stored thereon processor-executable software instructions configured to cause a processor of a computing device performing steps such that applying the selected theme to the computing device to change the keypad comprises applying the selected theme to a configurable keypad.

45. The non-transitory storage medium of claim 44, wherein the tangible storage medium has stored thereon processor-executable software instructions configured to cause a processor of a computing device performing steps further comprising applying the selected theme to the configurable keypad using a keypad protocol.

46. The non-transitory storage medium of claim 37, wherein the tangible storage medium has stored thereon processor-executable software instructions configured to cause a processor of a computing device performing steps further comprising applying the selected theme to a display-key keypad.

47. The non-transitory storage medium of claim 37, wherein the tangible storage medium has stored thereon processor-executable software instructions configured to cause a processor of a computing device performing steps further comprising applying the selected theme to a touchscreen keypad.

48. The non-transitory storage medium of claim 37, wherein the tangible storage medium has stored thereon processor-executable software instructions configured to cause a processor of a computing device performing steps further comprising applying the selected theme to key displays positioned adjacent to keys of a keypad.

49. A non-transitory storage medium having stored thereon processor-executable software instructions configured to cause a processor of a mobile computing device to perform steps comprising:
receiving data collected by a sensor on the mobile computing device, wherein the sensor comprises at least one sensor selected from the group consisting of a temperature sensor, a vibration sensor, a noise sensor, a breath alcohol sensor, an accelerometer, and an ambient light sensor;
sending the data collected by a sensor along with a request for an advertisement to an advertisement server via a network interface circuit;
receiving an advertisement relating to the data collected by the sensor from the server via the network interface circuit; and
displaying the advertisement on a display of the mobile computing device.

50. The non-transitory storage medium of claim 49, wherein the tangible storage medium has stored thereon processor-executable software instructions configured to cause a processor of the mobile computing device to further receive data from another sensor selected from the group consisting of a location sensor, and a Global Positioning System receiver.

51. The non-transitory storage medium of claim 49, wherein the tangible storage medium has stored thereon processor-executable software instructions configured to cause a processor of the mobile computing device to communicate with the server via a wireless data network.

52. A non-transitory storage medium having stored thereon processor-executable software instructions configured to cause a server processor to perform steps comprising:
receiving from a mobile computing device via a network connection a request for an advertisement including data collected by a sensor coupled to the mobile computing device, wherein the sensor comprises at least one sensor selected from the group consisting of a temperature sensor, a vibration sensor, a noise sensor, a breath alcohol sensor, an accelerometer, and an ambient light sensor;
generating an advertisement based on the sensor data; and
sending the generated advertisement to the mobile computing device via the network interface.

53. The non-transitory storage medium of claim 52, wherein the tangible storage medium having stored thereon processor-executable software instructions configured to cause a server processor to perform further steps comprising:
requesting advertisement information from a merchant server regarding advertisers located in the vicinity of the mobile computing device;
receiving advertisement information from the merchant server; and
generating the advertisement using the received advertisement information.

54. A computing device comprising:
a display;
a keypad;
means for sensing an ambient condition and generating corresponding sensor data;
means for selecting a theme based on the sensor data, wherein the theme is stored in a theme file comprising a theme element for changing a display of the computing device and a theme element for changing a keypad of the computing device; and
means for displaying the selected theme on the computing device to change the display and the keypad.

55. The computing device of claim 54, wherein the means for sensing an ambient condition comprises means for sensing an ambient temperature.

56. The computing device of claim 55, further comprising:
means for providing backlighting on the computing device; and
means for adjusting a color of the means for providing backlighting on the computing device in response to the temperature sensor data.

57. The computing device of claim 54, further comprising:
means for requesting a theme file of the selected theme from a server via a network; and
means for receiving the requested theme file of the selected theme.

58. The computing device of claim 54, further comprising:
means for comparing the data collected by the sensor to theme criteria within a theme list identifying a plurality of themes; and
selecting one of the plurality of themes for which the theme criteria is satisfied.

59. The computing device of claim 54, further comprising means for displaying the selected theme on a keypad.

60. A mobile computing device comprising:
means for sensing an ambient condition and generating corresponding sensor data, wherein the ambient condition comprises at least one ambient condition selected from the group consisting of temperature, vibration, noise, breath alcohol, acceleration, and ambient light;
means for sending the sensor data along with a request for an advertisement to a server;
means for receiving an advertisement from the server; and
means for displaying the advertisement on the mobile computing device.

61. A server configured to customize and distribute advertisements to a mobile computing device, comprising:
means for receiving a request for an advertisement including data collected by a sensor coupled to the mobile computing device, wherein the sensor comprises at least one sensor selected from the group consisting of a temperature sensor, a vibration sensor, a noise sensor, a breath alcohol sensor, an accelerometer, and an ambient light sensor;
means for generating an advertisement based on the sensor data; and
means for sending the generated advertisement to the mobile computing device.

62. The server of claim 61, further comprising:
requesting advertisement information from a merchant server regarding advertisers located in the vicinity of the mobile computing device;
receiving advertisement information from the merchant server; and
generating the advertisement using the received advertisement information.

* * * * *